(12) United States Patent
Kato et al.

(10) Patent No.: US 7,940,633 B2
(45) Date of Patent: May 10, 2011

(54) RECORDING DEVICE, RECORDING METHOD AND COMPUTER PROGRAM

(75) Inventors: Masahiro Kato, Saitama (JP); Masahiro Miura, Saitama (JP); Masayoshi Yoshida, Saitama (JP); Takeshi Koda, Saitama (JP); Keiji Katata, Saitama (JP)

(73) Assignee: Pioneer Corporation, Tokyo (JP)

( * ) Notice: Subject to any disclaimer, the term of this patent is extended or adjusted under 35 U.S.C. 154(b) by 1136 days.

(21) Appl. No.: 11/597,954

(22) PCT Filed: Dec. 26, 2005

(86) PCT No.: PCT/JP2005/023755
§ 371 (c)(1),
(2), (4) Date: Jan. 29, 2007

(87) PCT Pub. No.: WO2006/073079
PCT Pub. Date: Jul. 13, 2006

(65) Prior Publication Data
US 2008/0019248 A1 Jan. 24, 2008

(30) Foreign Application Priority Data
Jan. 6, 2005 (JP) .................... 2005-001821

(51) Int. Cl.
*G11B 7/24* (2006.01)
(52) U.S. Cl. .................... 369/275.3; 369/275.1
(58) Field of Classification Search ............ 369/275.1, 369/275.2, 275.3, 275.4, 94
See application file for complete search history.

(56) References Cited

U.S. PATENT DOCUMENTS
2005/0270934 A1* 12/2005 Lee et al. .............. 369/47.5

FOREIGN PATENT DOCUMENTS
| EP | 1 477 983 | 11/2004 |
| EP | 1 492 098 | 12/2004 |
| JP | 2000-311346 | 11/2000 |
| JP | 2001-23237 | 1/2001 |
| JP | 2002-216361 | 8/2002 |
| WO | WO 00/23990 | 4/2000 |
| WO | WO 00/62286 | 10/2000 |
| WO | WO 2004/112007 | 12/2004 |

OTHER PUBLICATIONS

"Double Layer DVD+R Multi-Media Command Set Description", Version 1.00, Internet Citation, Jun. 4, 2004, XP-002386267, pp. 1-48.
ECMA: Standardizing Information and Communication Systems, Standard ECMA-272, $2_{nd}$ Edition, 120 mm DVD Rewritable Disk (DVD-RAM), Jun. 1999, No. 272, XP-002186767, pp. 1-99.

* cited by examiner

*Primary Examiner* — Tan X Dinh
*Assistant Examiner* — Andrew J Sasinowski
(74) *Attorney, Agent, or Firm* — Young & Thompson

(57) ABSTRACT

A recording device has a recording unit for recording information in a medium having a first layer and a second layer; a forming unit for forming a buffer area in each of the first and second layers; and a control unit for controlling the forming unit to form the buffer area in the first layer to have a prescribed size and an edge on an outer circumference side of the buffer area in the second layer at a position, shifted from an area section of the second layer corresponding to the edge on the outer circumference side of the buffer area by a relative positional shift between an address at a prescribed position in the first layer and an address relating to the prescribed position in the second layer, or at a position shifted by a tolerance length indicating a tolerance range of such positional shift.

19 Claims, 11 Drawing Sheets

[FIG. 1]
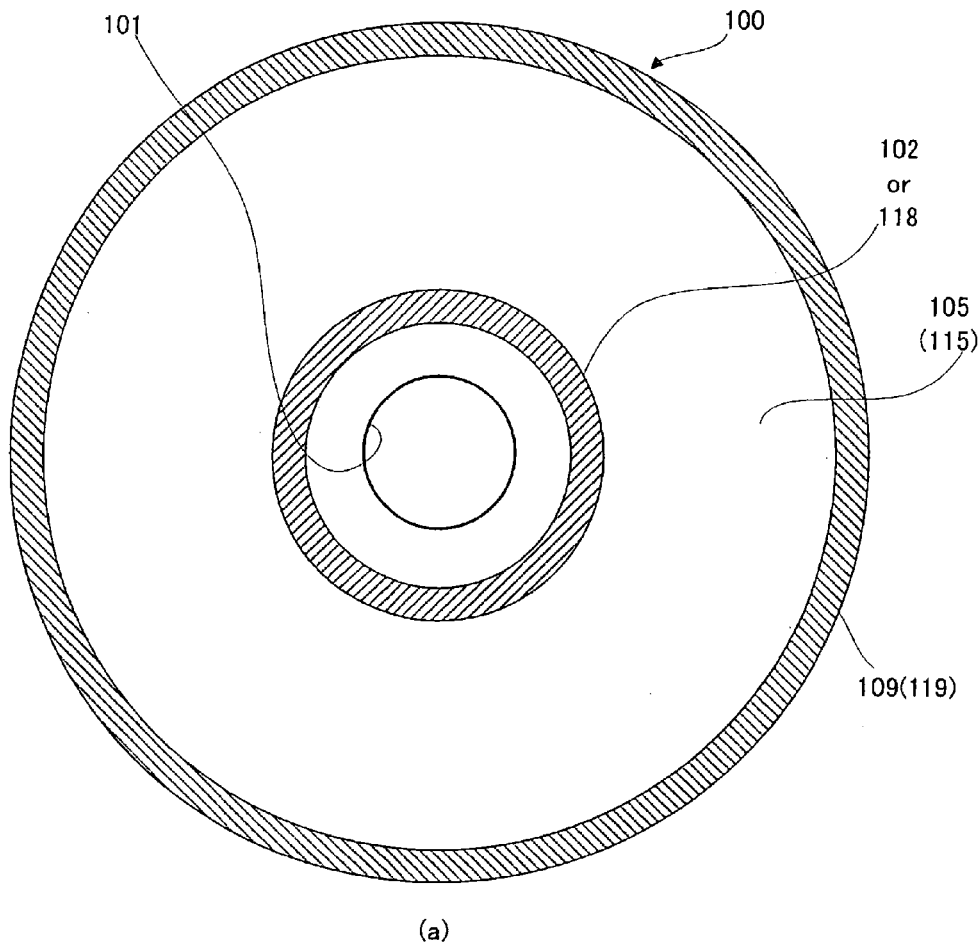
(a)
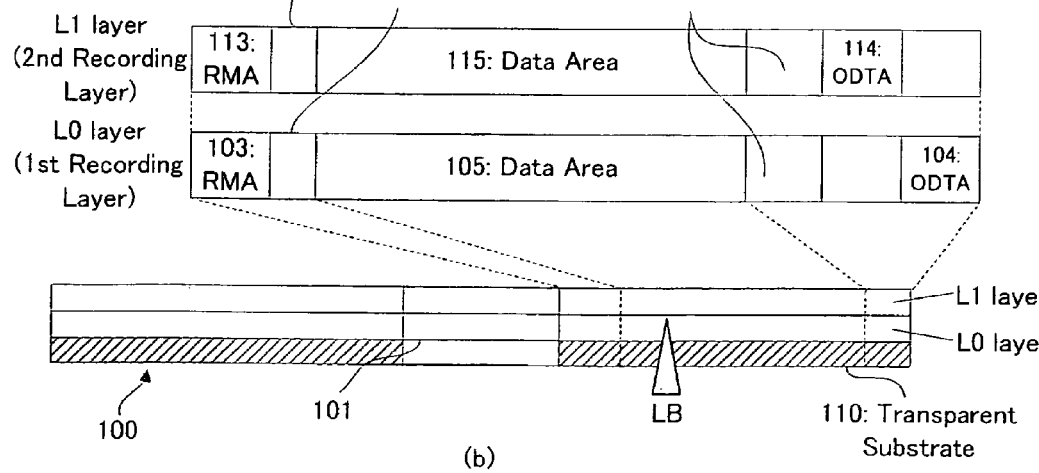
(b)

[FIG. 2]
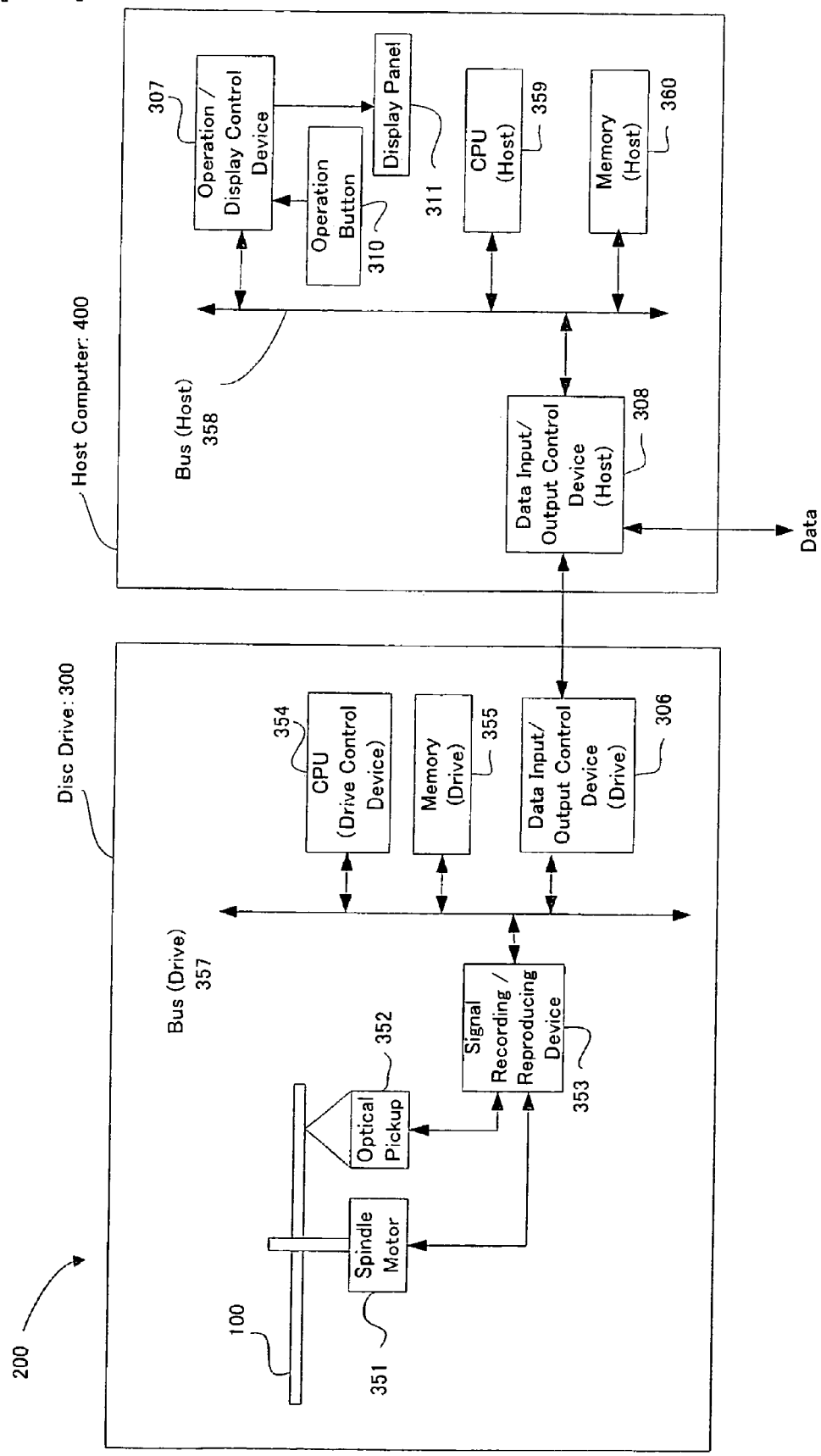

[FIG. 3]
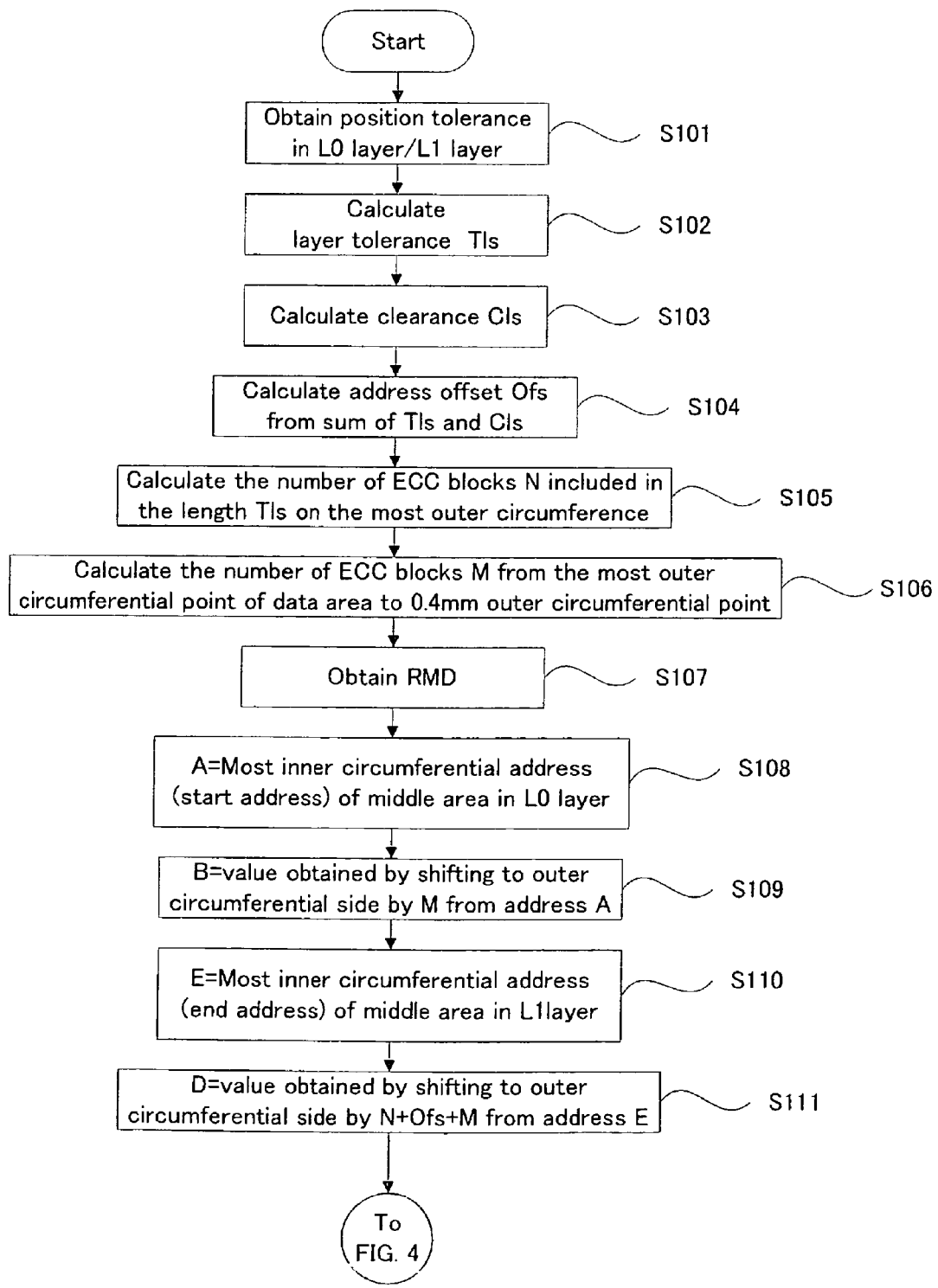

[FIG. 4]
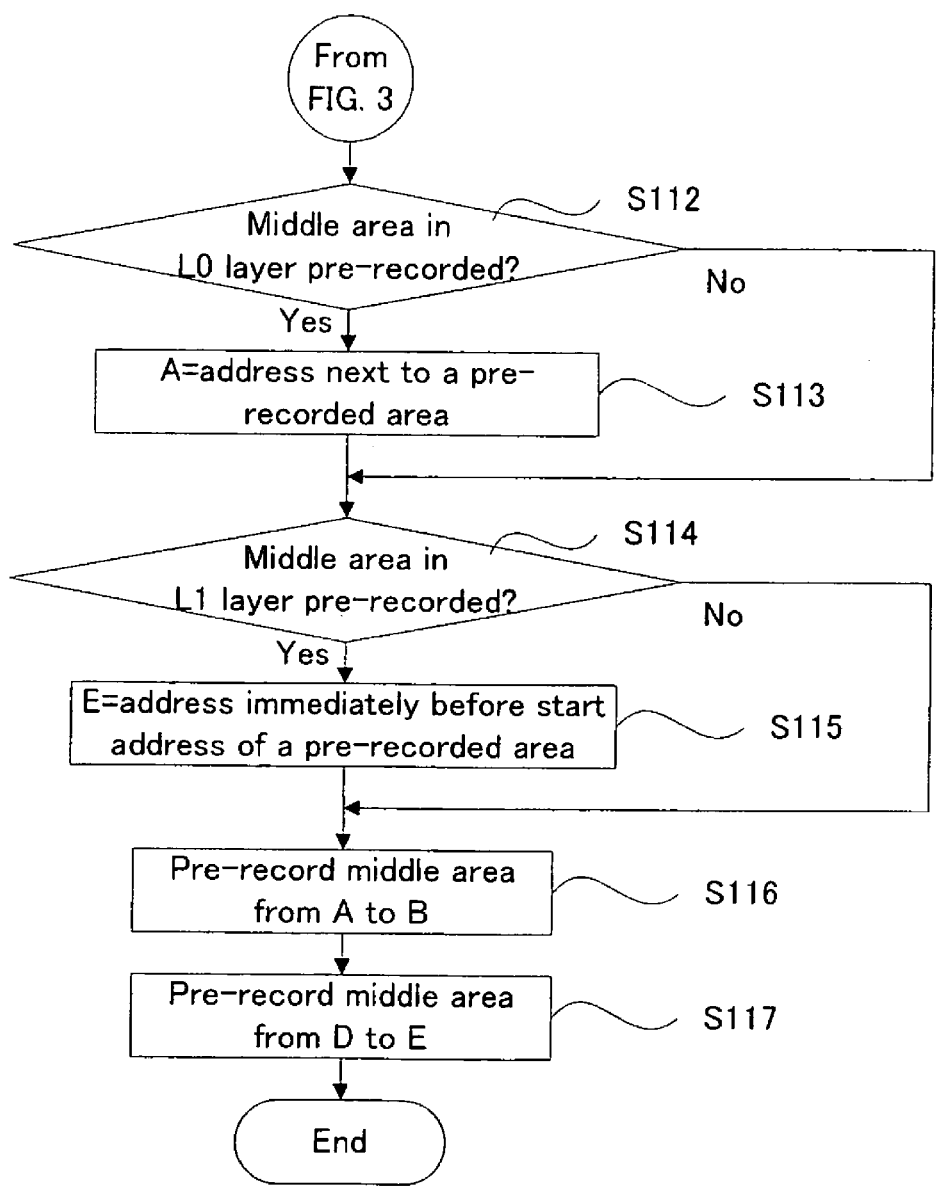

[FIG. 5]
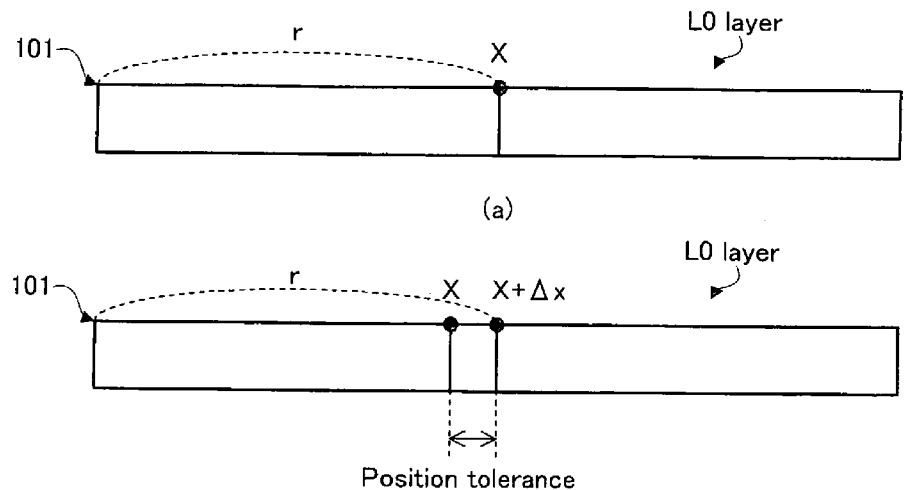
[FIG. 6]
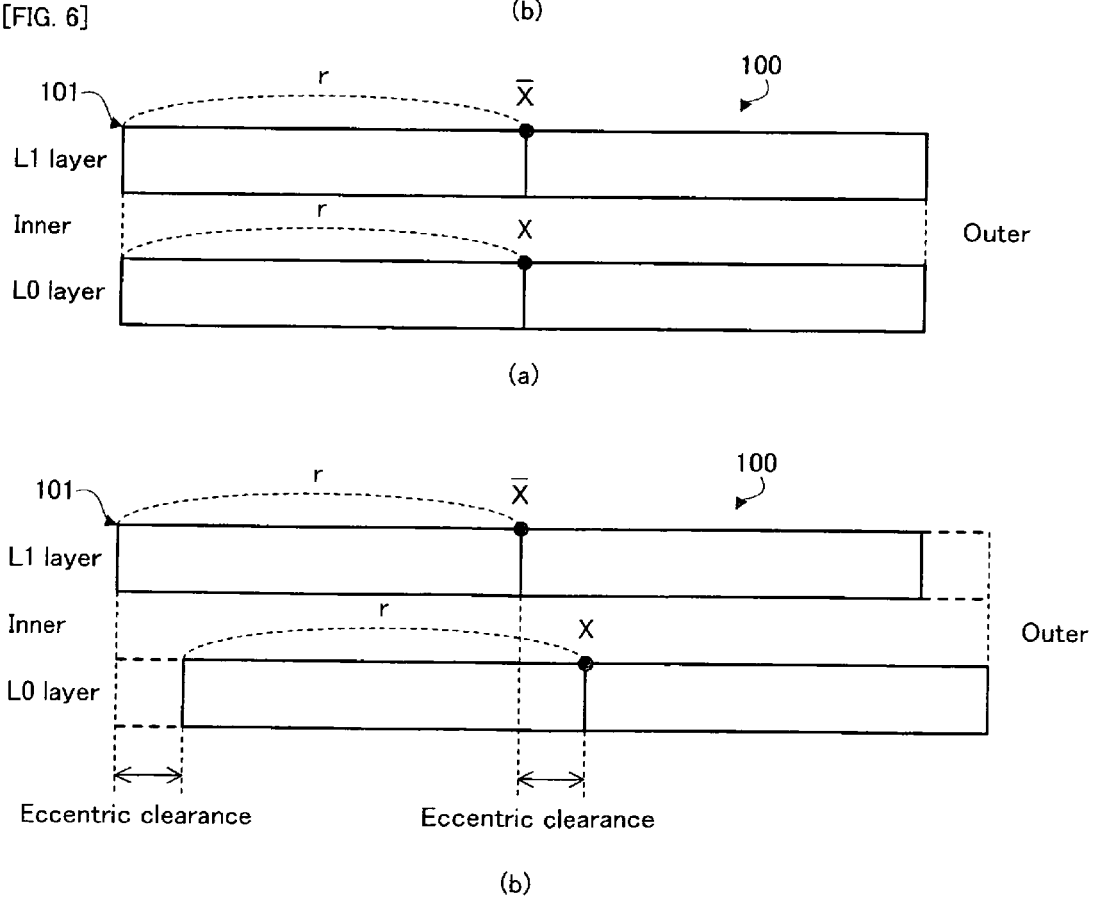

[FIG. 7]
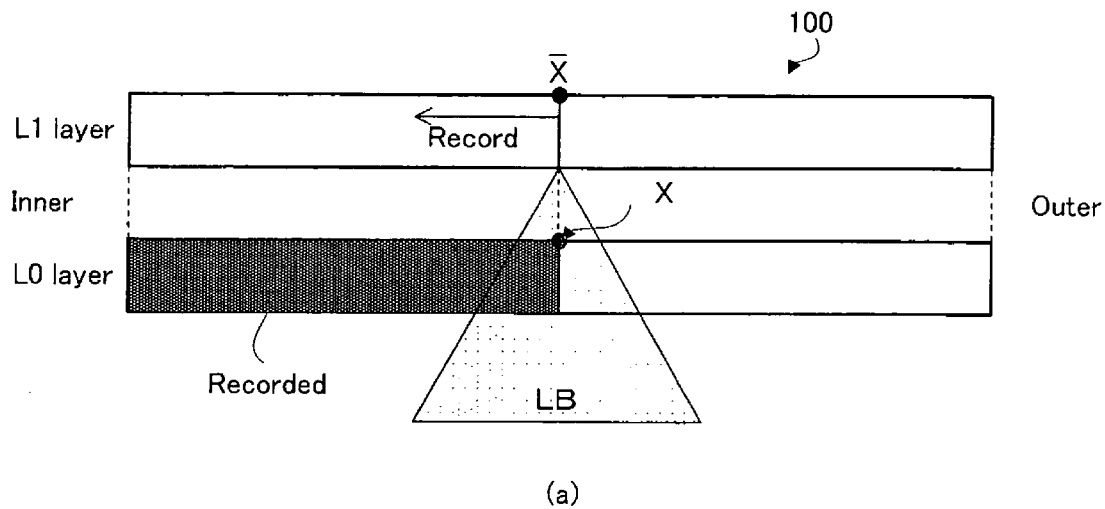
(a)
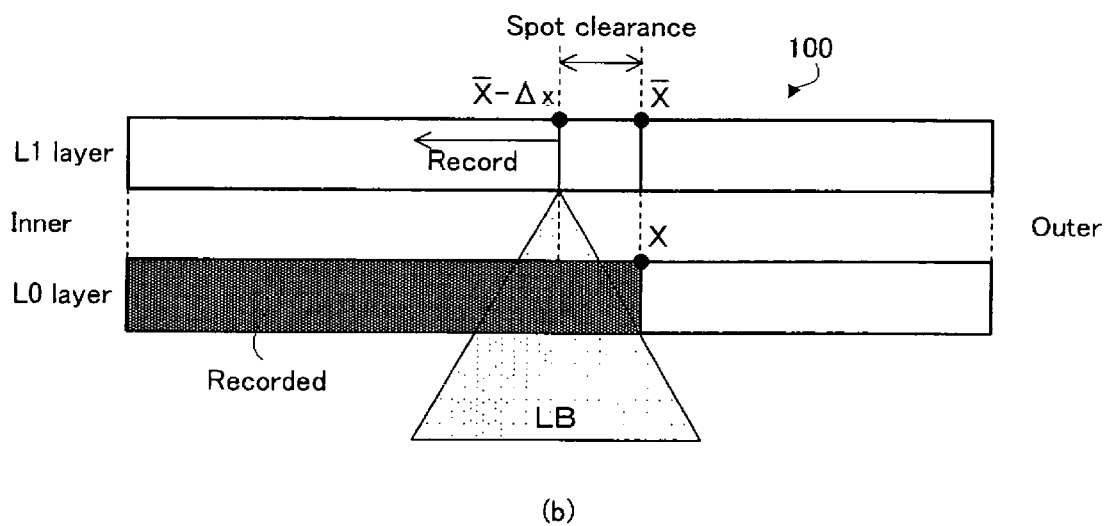
(b)

[FIG. 8]
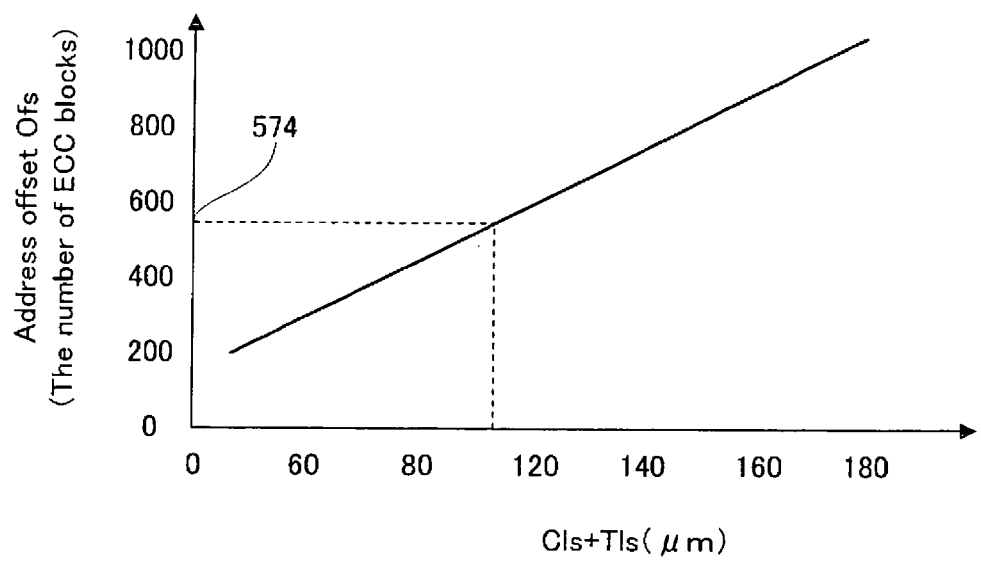
[FIG. 9]
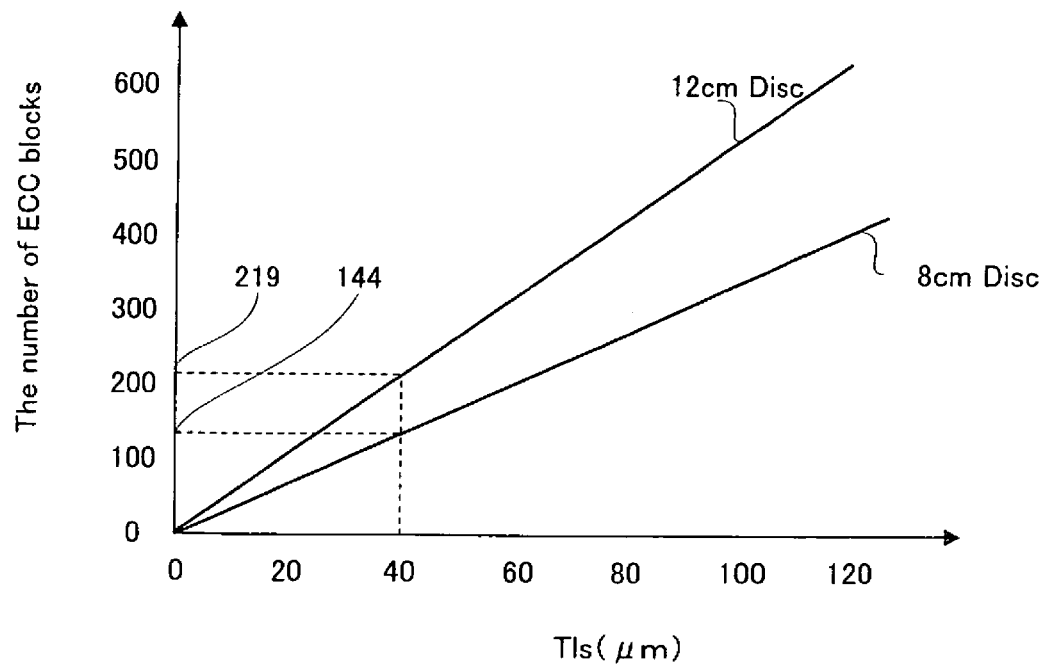

[FIG. 10]
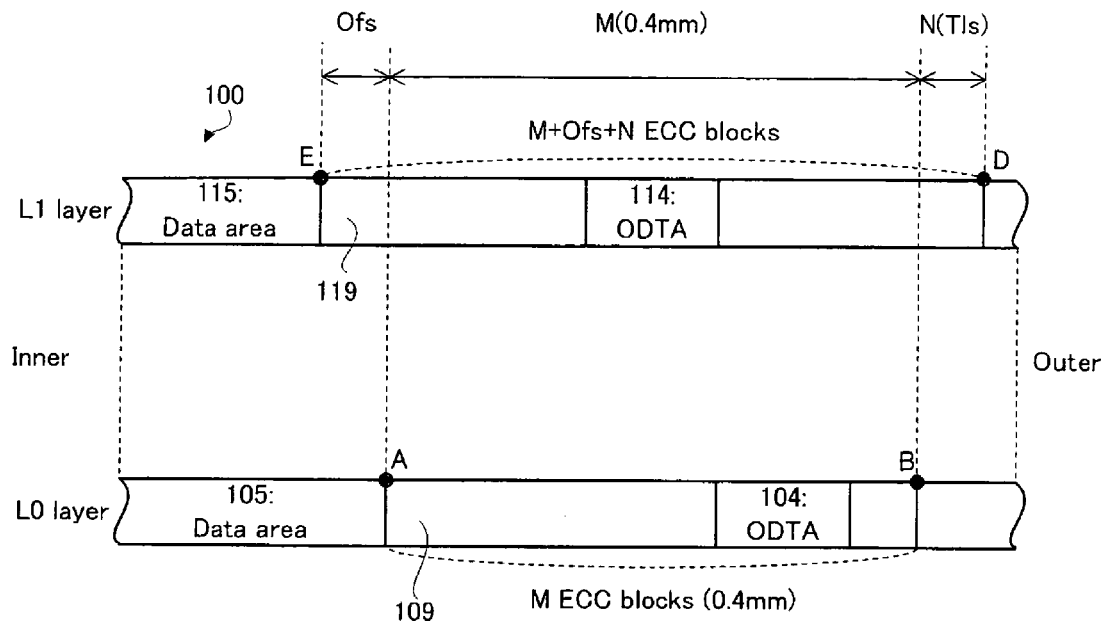
[FIG. 11]
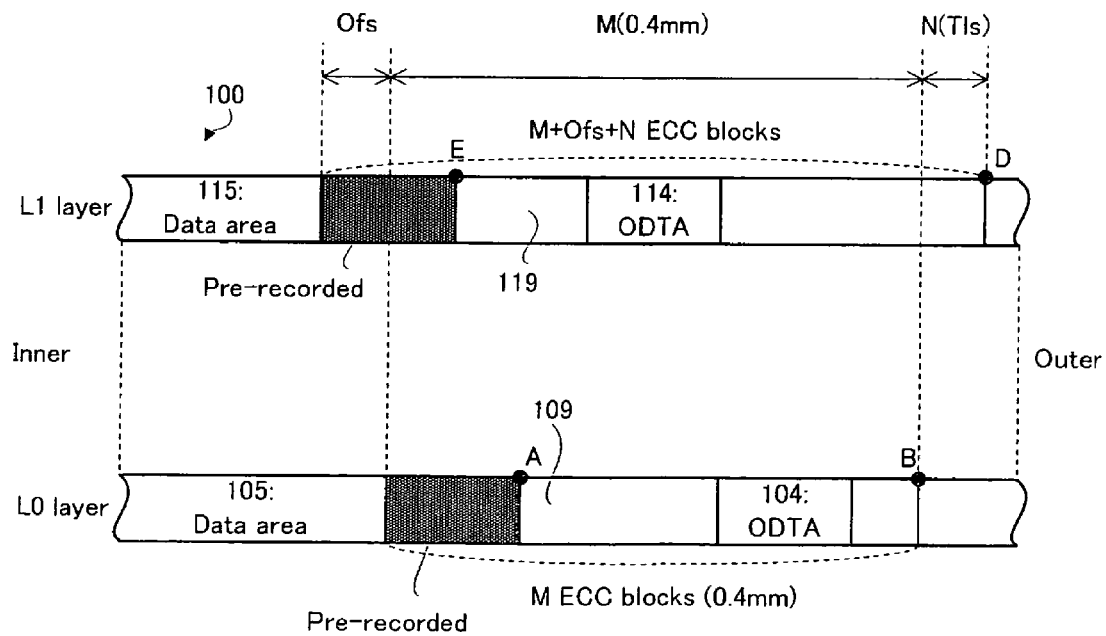

[FIG. 12]
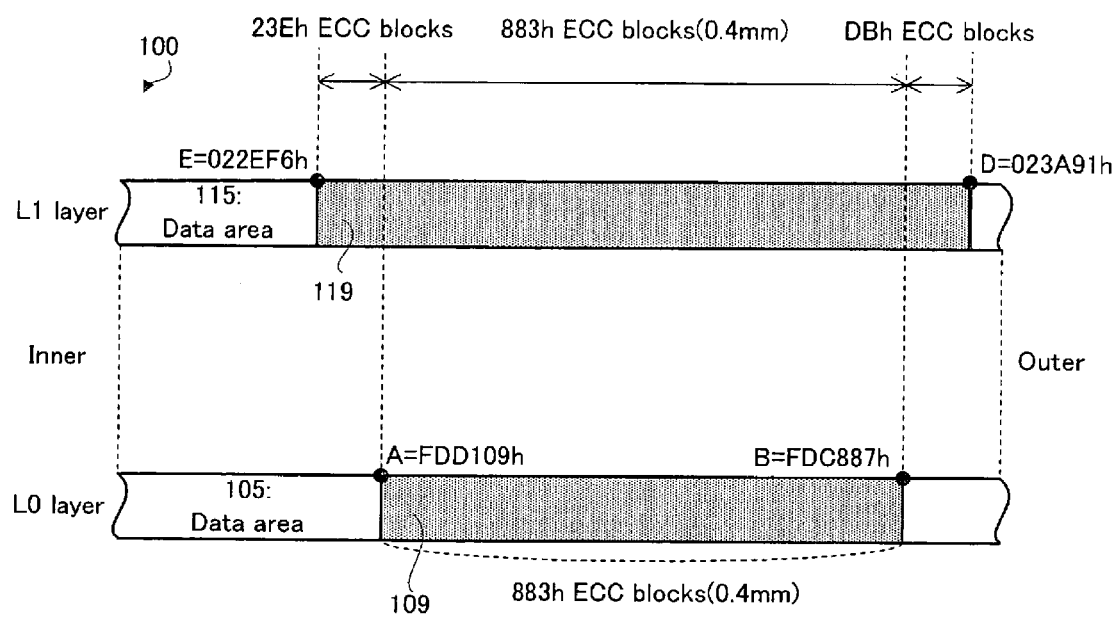
[FIG. 13]
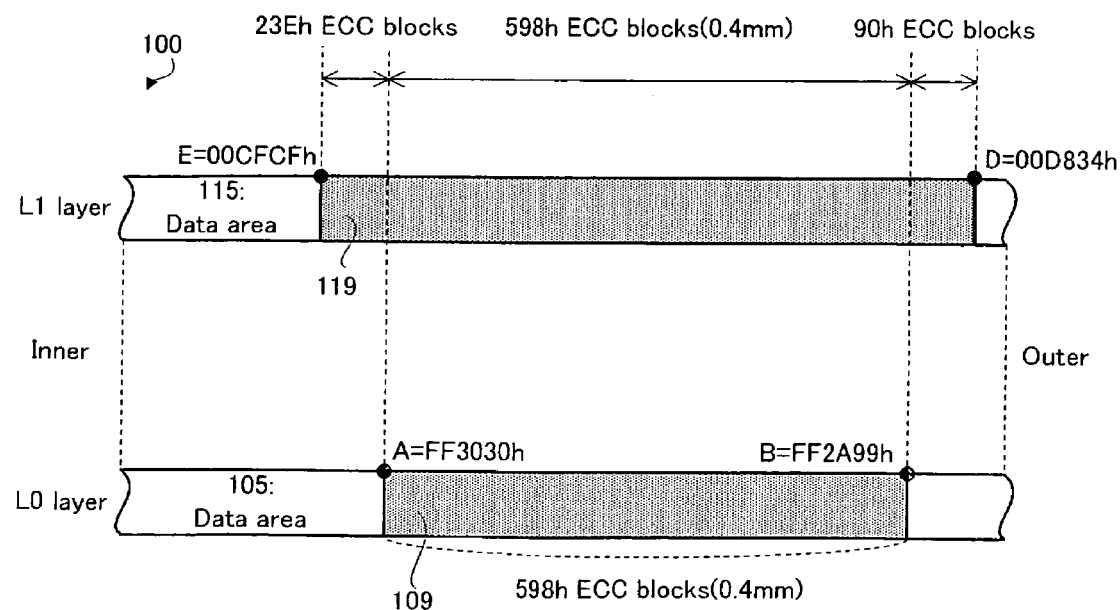

[FIG. 14]
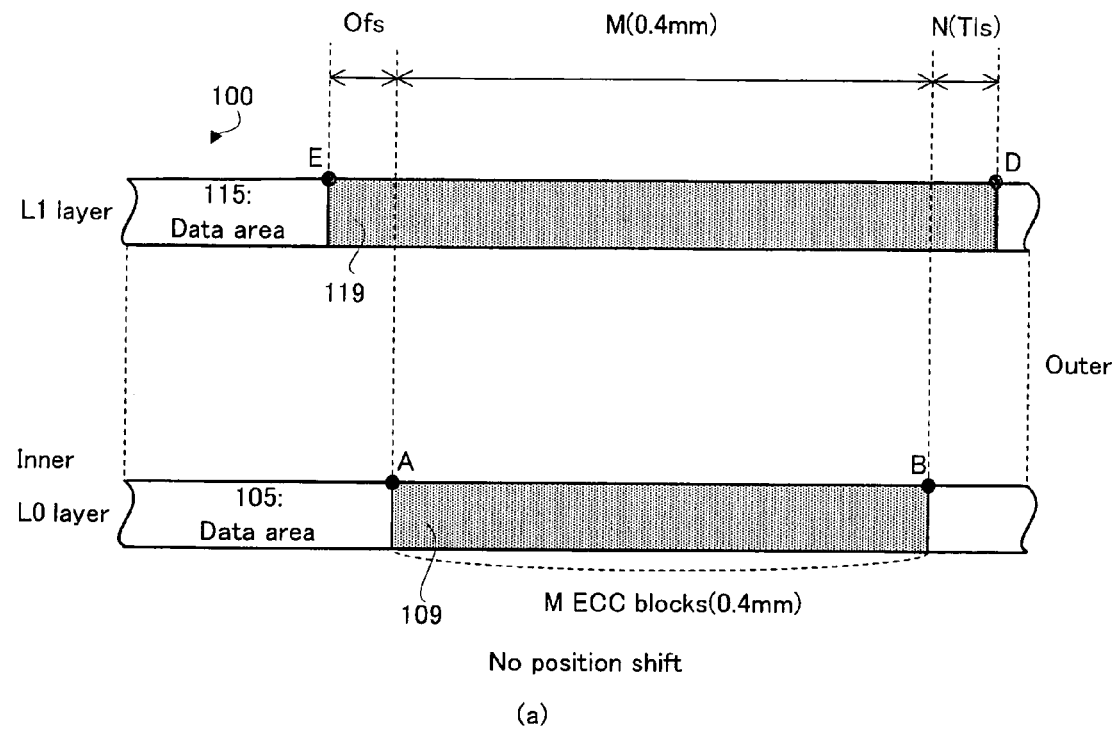
No position shift
(a)
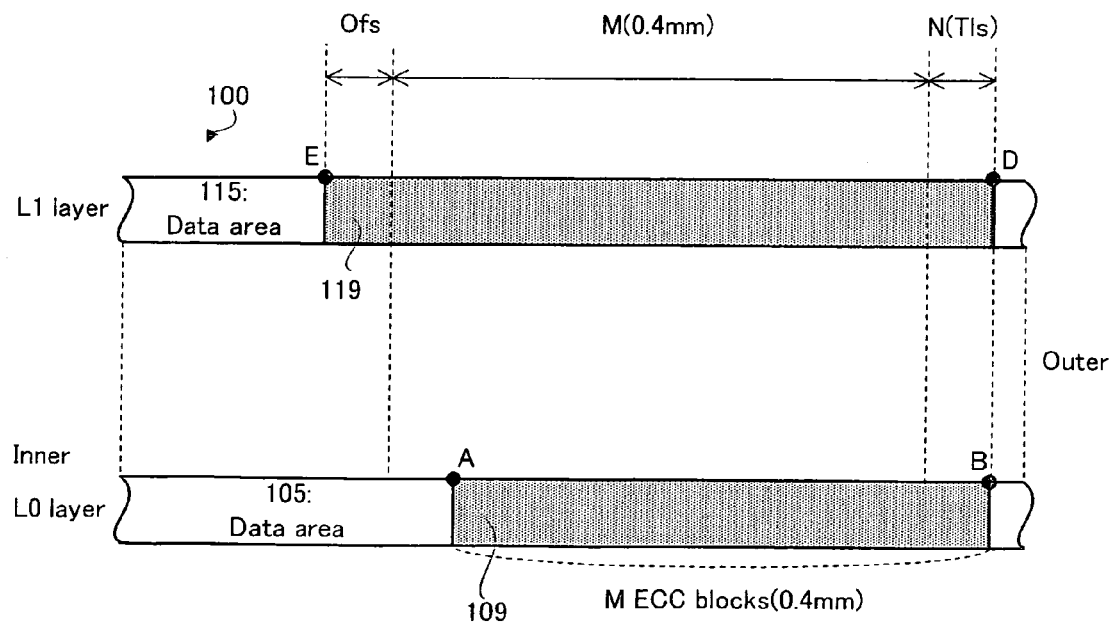
Maximum position shift
(b)

[FIG. 15]
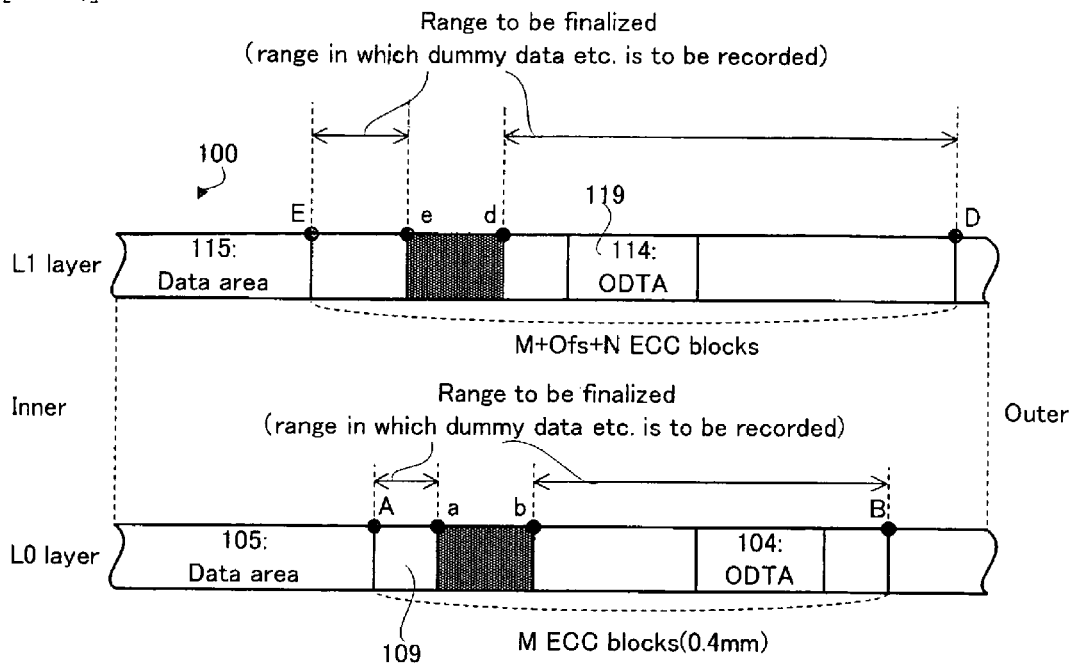
[FIG. 16]
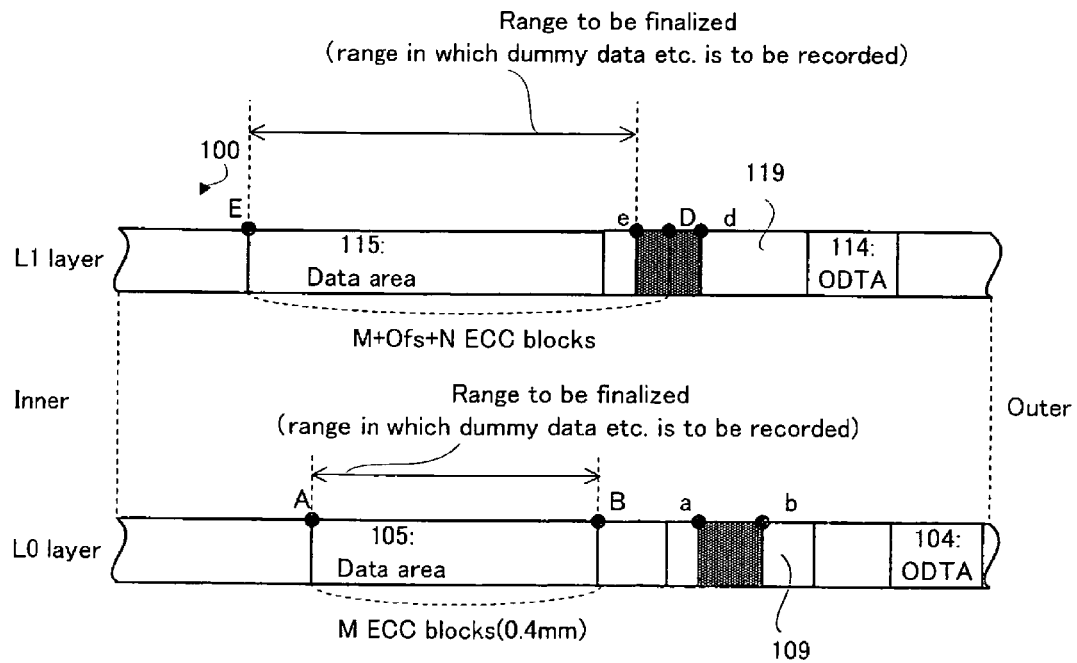

US 7,940,633 B2

RECORDING DEVICE, RECORDING METHOD AND COMPUTER PROGRAM

TECHNICAL FIELD

The present invention relates to a recording apparatus and method, such as a DVD recorder, and a computer program which makes a computer function as the recording apparatus.

BACKGROUND ART

In an information recording medium, such as a CD-ROM (Compact Disc-Read Only Memory), a CD-R (Compact Disc-Recordable), and a DVD-ROM, for example, as described in patent documents 1 and 2, etc., there is also developed an information recording medium, such as a multi-layer type optical disc, in which a plurality of recording layers are laminated or pasted on the same substrate. Then, on an information recording apparatus, such as a DVD recorder, for performing the recording with respect to the dual-layer type (i.e., two-layer type) optical disc, laser light for recording is focused on a recording layer located on the front (i.e. on the closer side to an optical pickup) as viewed from the irradiation side of the laser light (hereinafter referred to as an "L0 layer", as occassion demands) to thereby record data into the L0 layer in an irreversible change recording method or a rewritable method by heat. Moreover, the laser light is focused or condensed on a recording layer located on the rear of the L0 layer (i.e. on the farther side from the optical pickup) as viewed from the irradiation side of the laser light (hereinafter referred to as an "L1 layer", as occasion demands), through the L0 layer or the like, to thereby record information into the L1 layer in the irreversible change recording method or the rewritable method by heat.

patent document 1: Japanese Patent Application Laid Open NO. 2000-311346
patent document 2: Japanese Patent Application Laid Open NO. 2001-23237

DISCLOSURE OF THE INVENTION

Subject to be Solved by the Invention

For example, in the dual-layer type optical disc in an opposite track path method, for example, a middle area is located on the most outer circumferential side of the optical disc. The middle area is to buffer a changing operation in changing the focus of the laser light from the L0 layer to the L1 layer, and dummy data or the like is recorded into the middle area upon finalizing. At this time, an edge on the inner circumferential side of the middle area in the L0 layer and an edge on the outer circumferential side of the middle area in the L1 layer need to be away from each other by a predetermined distance (e.g. 0.4 mm) or more, from the viewpoint of operation stability. Namely, it is necessary to form the middle area having an optimum size in view of this point.

On the other hand, a position where an address of the L0 layer or the L1 layer is defined in design does not necessarily match a position where an address of the optical disc is actually defined, depending on the quality of a production process. In other words, there is a possibility that an optical disc is produced in which a certain address is located away from a radial position where the certain address is to be located in design. Thus, there is a technical problem that the edge on the inner circumferential side of the middle area in the L0 layer and the edge on the outer circumferential side of the middle area in the L1 layer are not away from each other by the predetermined distance or more, due to a position shift in the address or the like, even if the middle area in the optimum size is formed on the basis of the address defined on the optical disc. In order to avoid such a problem, it can be considered to form the middle area in a relatively large size; however, this has a technical problem that a time length required for a finalize process increases.

It is therefore an object of the present invention to provide a recording medium, and a recording apparatus and method, which can form a middle area in a preferable size without an increase in a time length required for the finalizing, for example, as well as a computer-readable recording medium recording thereon a computer program.

Means for Solving the Subject
(Recording Medium)

The above object of the present invention can be also achieved by a recording medium provided with: a first recording layer which is irradiated with laser light to thereby record therein record information; and a second recording layer which is irradiated with the laser light through the first recording layer to thereby record therein the record information, wherein each of the first recording layer and the second recording layer comprises a buffer area to buffer a changing operation of the recording layer in which the record information is recorded, a size of the buffer area in the first recording layer is set to be equal to or greater than a predetermined value, and an edge on an outer circumferential side of the buffer area in the second recording layer is disposed at a position obtained by shifting by a tolerance length, which indicates an acceptable range of a relative position shift (or the relative shift itself) between an address which is defined on the predetermined position in the first recording layer and an address which is related to the predetermined position in the second recording layer, from an area portion of the second recording layer corresponding to an edge on an outer circumferential side of the buffer area in the first recording layer.

According to the recording medium of the present invention, the record information is recorded into each of the first recording layer and the second recording layer. Then, the buffer area (e.g. a middle area described later) is formed in each of the first recording layer and the second recording layer. In particular, the buffer area is formed to be close to the outer circumferential side of a data area to record therein the record information. The buffer area is formed by recording therein dummy data or the like as the record information by performing the finalize process after the recording operation of the record information is ended, for example.

Particularly in the present invention, the size of the buffer area in the first recording layer is equal to or greater than a predetermined value. For example, the buffer area in the first recording layer has a size of 0.4 mm or more in the radial direction of the recording medium. On the other hand, the edge on the outer circumferential side of the buffer area in the second recording layer is disposed at a position obtained by shifting to the outer circumferential side, by the tolerance length, from the area portion of the second recording layer corresponding to the edge on an outer circumferential side of the buffer area in the first recording layer. The term "corresponding to" herein indicates that it exists at a substantially facing or opposed position in design (e.g. at substantially the same radial position). In an actual recording medium, it is not necessarily located at the facing position due to an influence or the like in the production process. Moreover, the "tolerance length" indicates the acceptable range of the relative position shift between an address which is defined on the predetermined position in the first recording layer and an address which is related to the predetermined position in the second recording layer. In other words, the "tolerance length" indicates the acceptable range of a relative position shift between an address which is defined on the predetermined position in the first recording layer and an address which is defined on the predetermined position in said second recording layer. In other words more, the "tolerance length" is the sum of: (i) a position shift in the first recording layer (or an acceptable range of the position shift in the first recording layer) between a position where a predetermined address is defined in design and a position of the predetermined address on the actually produced recording medium; and (ii) the position shift in the second recording layer (or an acceptable range of the position shift in the first recording layer) between a position where a predetermined address is defined in design and a position of the predetermined address on the actually produced recording medium.

As described above, the buffer area of the second recording layer is larger than the buffer area of the first recording layer, by a size corresponding to at least the tolerance length, toward the outer circumferential side. In addition, the size of the buffer area in the first recording layer is equal to or greater than the predetermined value. Therefore, even if there arises the position shift of the address or the like, a size between the edge on the inner circumferential side of the buffer area in the first recording layer and the edge on the outer circumferential side of the buffer area in the second recording layer is equal to or greater than the predetermined value. By this, there is no need to provide an unnecessarily large buffer area, which does not increase a time length required for the finalize process. Nevertheless, the size between the edge on the inner circumferential side of the buffer area in the first recording layer and the edge on the outer circumferential side of the buffer area in the second recording layer is equal to or greater than the predetermined value, so that it is possible to sufficiently ensure operation stability (particularly, stability in a reproduction operation).

As explained above, according to the recording medium of the present invention, the buffer area (middle area) in the preferable size is formed without an increase in a time length required for the finalize process, for example.

In one aspect of the recording medium of the present invention, a size of the buffer area in the second recording layer corresponds to a sum of (i) the predetermined value, (ii) a double size of the tolerance length, and (iii) a clearance length which indicates each of a spot radius of the laser light on the first recording layer if the laser light is focused on the second recording layer and a relative eccentric shift of the first and second recording layers.

According to this aspect, the buffer area is formed, in view of the eccentric shift and the size of the spot of the laser light or the like, in addition to the position shift in the address caused in the production process of the recording medium or the like. Therefore, the buffer area in the preferable size is formed, without an increase in a time length required for the finalize process, for example.

In another aspect of the recording medium of the present invention, the predetermined value is set to substantially 0.4 mm in a radial direction of the recording medium.

According to this aspect, it is possible to ensure a size of 0.4 mm or more between the edge on the inner circumferential side of the buffer area in the first recording layer and the edge on the outer circumferential side of the buffer area in the second recording layer. Therefore, it is possible to sufficiently ensure the operation stability.

Incidentally, it is preferable that the size between the edge on the inner circumferential side of the buffer area in the first recording layer and the edge on the outer circumferential side of the buffer area in the second recording layer is set to substantially 0.4 mm. By this, it is possible to prepare the buffer area in a minimum size necessary to ensure the operation stability. Thus, it is possible to relatively reduce a time length required for the finalize process.

In another aspect of the recording medium of the present invention, the tolerance length is set to substantially 40 µm in a radial direction of the recording medium.

According to this aspect, in the case of a DVD-R, which is one standard of the recording medium, for example, the acceptable range of the position shift in each recording layer is defined to be from substantially −20 µm to substantially 20 µm. In other words, a relative position shift of substantially −40 µm to substantially 40 µm is allowed between the first recording layer and the second recording layer. Therefore, by forming the buffer area on the basis of the tolerance length in view of the acceptable range, it is possible to preferably receive the above-mentioned various benefits. Of course, if a different value is determined as the acceptable range of the position shift in another standard, it is preferable to use the value instead of 40 µm.

In another aspect of the recording medium of the present invention, the clearance length is set to substantially 65 µm in a radial direction of the recording medium. Namely, the sum of the spot radius of the laser light on the first recording layer if the laser light is focused on the second recording layer and the relative eccentric shift of the first and second recording layers or the acceptable range of the eccentric shift is substantially 65 µm.

According to this aspect, the buffer area is formed in view of the actual size of the spot of the laser light and the eccentric shift or the like.

In another aspect of the recording medium of the present invention, the record information is recorded into the first recording layer in one direction, and the record information is recorded into the second recording layer in another direction different from the one direction.

According to this aspect, it is possible to receive the above-mentioned various benefits on the recording medium in the opposite track path method.

(Recording Apparatus)

The above object of the present invention can be also achieved by a recording apparatus provided with: a recording device for recording record information by irradiating laser light onto a recording medium provided with: (i) a first recording layer which is irradiated with the laser light to thereby record therein the record information; and (ii) a second recording layer which is irradiated with the laser light through the first recording layer to thereby record therein the record information; a forming device for forming a buffer area to buffer a changing operation of the recording layer in which the record information is recorded, in each of the first recording layer and the second recording layer; and a controlling device for controlling the forming device to form the buffer area in which a size of the buffer area in the first recording layer is set to be equal to or greater than a predetermined value, and in which an edge on an outer circumferential side of the buffer area in the second recording layer is disposed at a position obtained by shifting by a tolerance length, which indicates an acceptable range of a relative position shift between an address which is defined on the predetermined position in the first recording layer and an address which is related to the predetermined position in the second recording layer, from an area portion of the second recording layer corresponding to an edge on an outer circumferential side of the buffer area in the first recording layer.

According to the recording apparatus of the present invention, by the operation of the recording device, it is possible to preferably record the record information including video information, audio information or the like, onto the recording medium provided with both the first and second recording layers. For example, by irradiating the laser light so as to focus on the first recording layer, the record information is recorded into the first recording layer, while by irradiating the laser light so as to focus on the second recording layer, the record information is recorded into the second recording layer.

Moreover, by the operation of the forming device, the buffer area to buffer the changing operation of the recording layer in which the record information is recorded, is formed in each of the first and second recording layers. In particular, the buffer area is formed to be close to the outer circumferential side of the data area to record therein the record information. The buffer area is formed by recording therein dummy data or the like as the record information by performing the finalize process after the recording operation of the record information is ended, for example.

Particularly, in the present invention, by the operation of the controlling device, the buffer area of the first recording layer is formed such that the size thereof (e.g. the size in the radial direction of the recording medium) is equal to or greater than the predetermined value. Moreover, by the operation of the controlling device, the buffer area of the second recording layer is formed such that the edge on the outer circumferential side thereof is disposed at a position obtained by shifting to the outer circumferential side, by the tolerance length, from the area portion of the second recording layer corresponding to the edge on the outer circumferential side of the buffer area in the first recording layer.

As described above, the buffer area which is larger than the buffer area of the first recording layer, by a size corresponding to at least the tolerance length, toward the outer circumferential side, is formed in the second recording layer. In addition, the buffer area in the size that is equal to or greater than the predetermined value is formed in the first recording layer. Therefore, as described above, even if there arises the position shift of the address or the like, a size between the edge on the inner circumferential side of the buffer area in the first recording layer and the edge on the outer circumferential side of the buffer area in the second recording layer is equal to or greater than the predetermined value. By this, there is no need to provide an unnecessarily large buffer area, which does not increase a time length required for the finalize process. Nevertheless, the size between the edge on the inner circumferential side of the buffer area in the first recording layer and the edge on the outer circumferential side of the buffer area in the second recording layer is equal to or greater than the predetermined value, so that it is possible to sufficiently ensure operation stability (particularly, stability in the reproduction operation).

As explained above, according to the recording apparatus of the present invention, the middle area (i.e. the buffer area) in the preferable size is formed without an increase in a time length required for the finalize process, for example.

In one aspect of the recording apparatus of the present invention, the controlling device controls the forming device such that a size of the buffer area in the second recording layer corresponds to a sum of (i) the predetermined value, (ii) a double size of the tolerance length, and (iii) a clearance length which indicates each of a spot radius of the laser light on the first recording layer if the laser light is focused on the second recording layer and a relative eccentric shift of the first and second recording layers.

According to this aspect, the buffer area is formed, in view of the eccentric shift and the size of the spot of the laser light or the like, in addition to the position shift in the address caused in the production process of the recording medium or the like. Therefore, the buffer area in the preferable size is formed, without an increase in a time length required for the finalize process, for example.

In another aspect of the recording apparatus of the present invention, the recording apparatus is further provided with a converting device for converting the tolerance length to a recording unit of the record information, and the controlling device controls the forming device to form the buffer area, disposed at a position obtained by shifting by an extent corresponding to the tolerance length which is converted to the recording unit.

According to this aspect, it is possible to recognize the tolerance length by the recording unit (e.g. ECC block unit) of the record information which is easily recognized or easily handled by the recording apparatus. Therefore, the recording apparatus can form the buffer area as described above, preferably and relatively easily.

In an aspect of the recording apparatus provided with the converting device, as described above, the converting device may convert the tolerance length to the recording unit of the record information, on the basis of correspondence information which defines a correspondence relationship between the tolerance length and a size of the record information which can be recorded into an area portion having a size corresponding to a predetermined tolerance length.

By such construction, it is possible to convert the tolerance length to the recording unit of the record information, relatively easily, by referring to the correspondence information.

In an aspect of the recording apparatus in which the tolerance length is converted to the recording unit on the basis of the correspondence information, as described above, the converting device converts the tolerance length to the recording unit of the record information, on the basis of at least one of a plurality of correspondence information, in accordance with at least one of a type of the recording medium and a position of the buffer area on the second recording layer.

By such construction, it is possible to convert the tolerance length to the recording unit of the record information, relatively easily, without influence of a difference in the type of the recording medium and a difference in the arrangement of the buffer area, yet depending on each difference.

In an aspect of the recording apparatus in which the tolerance length is converted to the recording unit on the basis of the correspondence information, as described above, the recording apparatus may be further provided with a storing device for storing the correspondence information.

By such construction, it is possible to convert the tolerance length to the recording unit of the record information, relatively easily, by referring to the correspondence information stored in the storing device.

In an aspect of the recording apparatus in which the tolerance length is converted to the recording unit on the basis of the correspondence information, as described above, the converting device may convert the tolerance length to the recording unit of the record information, on the basis of the correspondence information recorded on the recording medium.

By such construction, even in the recording apparatus which does not have the correspondence information, it is possible to convert the tolerance length to the recording unit of the record information, relatively easily, by referring to the correspondence information recorded on the recording medium.

In another aspect of the recording apparatus of the present invention, the predetermined value is set to substantially 0.4 mm in a radial direction of said recording medium.

According to this aspect, it is possible to ensure a size of 0.4 mm or more between the edge on the inner circumferential side of the buffer area in the first recording layer and edge on the outer circumferential side of the buffer area in the second recording layer. Therefore, preferably, it is possible to sufficiently ensure the operation stability.

In another aspect of the recording apparatus of the present invention, the tolerance length is 40 μm in a radial direction of the recording medium. Namely, the controlling device controls the forming device to form the buffer area, in which the edge on the outer circumferential side of the buffer area in the second recording layer is disposed at a position obtained by shifting only by 40 μm, from the area portion of the second recording layer corresponding to the edge on the outer circumferential side of the buffer area in the first recording layer.

According to this aspect, the buffer area is formed on the basis of the tolerance length in view of the acceptable range. Thus, it is possible to preferably receive the above-mentioned various benefits. Of course, if a different value is determined as the acceptable range of the position shift in another standard, it is preferable to use the value instead of 40 μm.

In another aspect of the recording apparatus of the present invention, the clearance length is 65 μm in a radial direction of said recording medium. Namely, the sum of the spot radius of the laser light on the first recording layer if the laser light is focused on the second recording layer and the relative eccentric shift of the first and second recording layers or the acceptable range of the eccentric shift is 65 μm.

According to this aspect, the buffer area is formed in view of the actual size of the spot of the laser light and the eccentric shift or the like.

In another aspect of the recording apparatus of the present invention, the buffer area is formed by recording therein the record information, and the controlling device controls the forming device to form the buffer area by recording therein the record information, except an area portion in which the record information is recorded in advance.

According to this aspect, the buffer area is formed by recording therein the predetermined record information (e.g. dummy data or the like described later). At this time, there is likely a case where the record information is recorded in advance in the area portion which is regarded as the buffer area, before the finalize process, in order to reduce a time length required for the finalize process. In this aspect, even in that case, the area portion in which the pre-information is pre-recorded is not redundantly overwritten with the record information. Therefore, there is no need to unnecessarily record the record information in order to form the buffer area, so that it is possible to efficiently form the buffer area.

In another aspect of the recording apparatus of the present invention, the record information is recorded into the first recording layer in one direction, and the record information is recorded into the second recording layer in another direction different from the one direction.

According to this aspect, it is possible to receive the above-mentioned various benefits on the recording medium in the opposite track path method.

(Recording Method)

The above object of the present invention can be also achieved by a recording method in a recording apparatus provided with: a recording device for recording record information by irradiating laser light onto a recording medium comprising: (i) a first recording layer which is irradiated with the laser light to thereby record therein the record information; and (ii) a second recording layer which is irradiated with the laser light through the first recording layer to thereby record therein the record information; and a forming device for forming a buffer area to buffer a changing operation of the recording layer in which the record information is recorded, in each of the first recording layer and the second recording layer, the recording method provided with: a first controlling process of controlling the recording device to record the record information; and a second controlling process of controlling the forming device to form the buffer area in which a size of the buffer area in the first recording layer is set to be equal to or greater than a predetermined value, and in which an edge on an outer circumferential side of the buffer area in the second recording layer is disposed at a position obtained by shifting by a tolerance length, which indicates an acceptable range of a relative position shift between an address which is defined on the predetermined position in the first recording layer and an address which is related to the predetermined position in the second recording layer, from an area portion of the second recording layer corresponding to an edge on an outer circumferential side of the buffer area in the first recording layer.

According to the recording method of the present invention, it is possible to receive the same benefits as those owned by the above-mentioned recording apparatus of the present invention.

Incidentally, in response to the various aspects of the above-mentioned recording apparatus of the present invention, the recording method of the present invention can adopt various aspects.

(Computer Program)

The above object of the present invention can be also achieved by a computer program of instructions for recording control and for tangibly embodying a program of instructions executable by a computer provided in the recording apparatus (including its various aspects), to make the computer function as at least one portion of the recording apparatus (specifically, e.g. the controlling device).

According to the computer program of the present invention, the above-mentioned recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned recording apparatus of the present invention, the computer program of the present invention can adopt various aspects.

The above object of the present invention can be also achieved by a computer program product in a computer-readable medium for tangibly embodying a program of instructions executable by a computer provided in the above-mentioned recording apparatus of the present invention (including its various aspects), to make the computer function as at least one portion of the recording apparatus (specifically, e.g. the controlling device).

According to the computer program product of the present invention, the above-mentioned recording apparatus can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-mentioned recording apparatus.

These effects and other advantages of the present invention will become more apparent from the following embodiments.

As explained above, in the recording medium of the present invention, the middle area of the first recording layer has a size of the predetermined value or more, and the edge on the outer circumferential side of the middle area in the second recording layer is disposed at a position obtained by shifting only by the tolerance length from the edge on the outer circumferential side of the middle area in the first recording layer. Therefore, the middle area in the preferable size is formed without an increase in a time length required for the finalize process, for example. Moreover, the recording apparatus of the present invention is provided with the recording device, the forming device, and the controlling device. The recording method of the present invention is provided with the first controlling process and the second controlling process. Therefore, the middle area in the preferable size is formed without an increase in a time length required for the finalize process, for example.

BRIEF DESCRIPTION OF DRAWINGS

FIG. 1 are a substantial plan view showing the basic structure of an optical disc in an embodiment of the present invention, and a schematic cross sectional view of the optical disc and a corresponding conceptual diagram showing a recording area structure in the radial direction.

FIG. 2 is a block diagram conceptually showing the basic structure of a recording/reproducing apparatus in the embodiment.

FIG. 3 is a flowchart conceptually showing a flow of a formation operation of a middle area (a partial operation of a finalize process), out of the recording operation of the recording/reproducing apparatus in the embodiment.

FIG. 4 is a flowchart conceptually showing a flow of a formation operation of a middle area (a partial operation of a finalize process), out of the recording operation of the recording/reproducing apparatus in the embodiment.

FIG. 5 are schematic conceptual views conceptually showing a position tolerance.

FIG. 6 are schematic conceptual views conceptually showing an eccentric clearance out of clearance.

FIG. 7 are schematic conceptual views conceptually showing a spot clearance out of clearance.

FIG. 8 is a graph conceptually showing one specific example of a corresponding equation.

FIG. 9 is a graph conceptually showing another specific example of the corresponding equation.

FIG. 10 is a schematic conceptual view schematically showing a relationship between each area and an address on the optical disc if dummy data or the like is not pre-recorded in the middle area.

FIG. 11 is a schematic conceptual view schematically showing the relationship between each area and the address on the optical disc if the dummy data or the like is already pre-recorded in the middle area.

FIG. 12 is a schematic conceptual view showing the specific value of the address of a DVD-R with a diameter of 12 cm, which is one specific example of the optical disc.

FIG. 13 is a schematic conceptual view showing the specific value of the address of a DVD-R with a diameter of 8 cm, which is another specific example of the optical disc.

FIG. 14 are schematic conceptual views schematically showing the relationship between each area and the address on the optical disc without the position shift and with the maximum position shift.

FIG. 15 is a schematic conceptual view schematically showing the relationship between each area and the address on the optical disc if the dummy data or the like is pre-recorded before a finalize process.

FIG. 16 is a schematic conceptual view schematically showing the relationship between each area and the address on the optical disc if the dummy data or the like is pre-recorded before the finalize process.

DESCRIPTION OF REFERENCE CODES

100 Optical disc
109, 119 Middle area
200 Recording/reproducing apparatus
352 Optical pickup
353 Signal recording/reproducing device
354, 359 CPU
355, 360 Memory

BEST MODE FOR CARRYING OUT THE INVENTION

Hereinafter, the best mode for carrying out the invention will be explained in each embodiment in order, with reference to the drawings.

At first, with reference to FIG. 1, an explanation will be given to an optical disc on which data is recorded and reproduced by a recording/reproducing apparatus 200 (refer to FIG. 2) as being an embodiment according to the recording apparatus of the present invention. FIG. 1(*a*) is a substantial plan view showing the basic structure of an optical disc in the embodiment, and FIG. 1(*b*) is a schematic cross sectional view of the optical disc and a corresponding conceptual diagram showing a recording area structure in the radial direction.

As shown in FIG. 1(*a*) and FIG. 1(*b*), an optical disc 100 has a recording surface on a disc main body with a diameter of about 12 cm, as is a DVD. On the recording surface, the optical disc 100 is provided with: a center hole 101 as being the center; a lead-in area 102 or a lead-out area 118; data areas 105 and 115; and middle areas 109 and 119 which constitute one specific example of the "buffer area" of the present invention. Then, in the optical disc 100, recording layers or the like are laminated on a transparent substrate 110, for example. In each recording area of the recording layers, a track or tracks, such as groove tracks and land tracks, are alternately placed, spirally or concentrically, with the center hole 101 as the center. Moreover, on the track, data is divided by a unit of ECC block and recorded. The ECC block is a data management unit by which the recording information can be error-corrected.

Incidentally, the present invention is not particularly limited to the optical disc having the three areas as described above. For example, even if the lead-in area 102, the lead-out area 118 or the middle area 109 (119) do not exist, a data structure and the like explained below can be constructed. Moreover, as described later, the lead-in area 102 and the lead-out area 118 or the middle area 109 (119) may be further segmentized.

Particularly, the optical disc 100 in the embodiment, as shown in FIG. 1(*b*), has such a structure that an L0 layer and an L1 layer, which constitute one example of the "first and second recording layers" of the present invention, respectively, are laminated on the transparent substrate 110. Upon the recording and reproduction of such a dual-layer type optical disc 100, the data recording/reproduction in the L0 layer or the L1 layer is performed, depending on which recording layer has the focus position of laser light LB, irradiated from the lower side to the upper side in FIG. 1(b). In particular, in the L0 layer, the data is recorded from the inner to the outer circumferential side, while in the L1 layer, the data is recorded from the outer to the inner circumferential side. In other words, the optical disc 100 in the embodiment corresponds to an optical disc in the opposite track path method. Even an optical disc in a parallel track path method can also receive various benefits described later, by adopting a structure discussed below.

The optical disc 100 in the embodiment is provided with RMA (Recording Management Areas) 103 and 113 on the inner circumferential side of the lead-in area 102 and the lead-out area 118, and ODTA (Outer Disc Testing Areas) 104 and 114 on the outer circumferential side of the middle areas 109 and 119.

The RMA 103 and 113 are recording areas to record therein various management information for managing the recording of the data onto the optical disc 100. Specifically, the management information or the like which indicates the arrangement or the recording state or the like of the data recorded on the optical disc 100, for example, is recorded.

The ODTA 104 and 114 are recording areas to perform an OPC (Optimum Power Control) process of adjusting (or calibrating) the laser power of laser light LB, in recording the data onto the optical disc 100. An OPC pattern is recorded into the ODTA 104 and 114 while the laser power is changed in stages and the reproduction quality (e.g. asymmetry, etc.) of the recorded OPC pattern is measured, by which an optimum laser power in recording the data is calculated. In particular, the ODTA 114 of the L1 layer is located adjacent to the middle area 119, and the ODTA 114 of the L1 layer is located not to overlap the ODTA 104 of the L0 layer and the middle area 109, as viewed from the irradiation side of the laser light LB. In order to preferably perform the OPC process without influence of the other recording layer, when the OPC process is performed by using the ODTA 114 of the L1 layer, the OPC pattern is recorded through the L0 layer in which the data is unrecorded. Obviously, the same is true for the ODTA 104 of the L0 layer.

Moreover, the optical disc 100 in the embodiment is not limited to a dual-layer, single-sided type, i.e., a dual layer type, but may be a dual-layer, double-sided type. Furthermore, the optical disc 100 in the embodiment is not limited to the optical disc having the two recording layers, as described above, but may be an optical disc of a multilayer type which has three or more layers.

Moreover, the above explanation is made as if the positions of the middle areas 109 and 119 were already fixed; however, in the actual finalize process, the dummy data is recorded throughout a wide area including the ODTA 104 and 114. As a result, the final middle areas 109 and 119 are formed, spreading even to the positions of the ODTA 104 and 114. The arrangement of the middle areas 109 and 119, explained in FIG. 1, is sort of an indication or a rough guide determined by default.

(Recording/Reproducing Apparatus)

Next, with reference to FIG. 2 to FIG. 16, the structure and operation of the recording/reproducing apparatus 200, as being an embodiment according to the recording apparatus of the present invention, will be explained.

(1) Basic Structure

At first, with reference to FIG. 2, the basic structure of the recording/reproducing apparatus 200 will be discussed. FIG. 2 is a block diagram conceptually showing the basic structure of the recording/reproducing apparatus 200 in the embodiment. Incidentally, the recording/reproducing apparatus 200 has a function of recording the data onto the optical disc 100 and a function of reproducing the data recorded on the optical disc 100.

As shown in FIG. 2, the recording/reproducing apparatus 200 is provided with: a disc drive 300 into which the optical disc 100 is actually loaded and in which the data is recorded and reproduced; and a host computer 400, such as a personal computer, for controlling the recording and reproduction of the data with respect to the disc drive 300.

The disc drive 300 is provided with: the optical disc 100; a spindle motor 351; an optical pickup 352; a signal recording/reproducing device 353; the CPU (drive control device) 354; a memory 355; a data input/output control device 306; and a bus 357. Moreover, the host computer 400 is provided with: a CPU 359; a memory 360; an operation/display control device 307; an operation button 310; a display panel 311; and a data input/output control device 308.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 constitutes one specific example of the "recording device" of the present invention and is provided with a semiconductor laser device, a lens, and the like, to perform the recording/reproduction with respect to the optical disc 100. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100. More specifically, the signal recording/reproducing device 353 is provided with: a laser diode (LD) driver; a head amplifier; and the like, for example. The laser diode driver (LD driver) drives a not-illustrated semiconductor laser device located in the optical pickup 352. The head amplifier amplifies the output signal of the optical pickup 352, i.e. the reflective light of a light beam, and outputs the amplified signal. More specifically, the signal recording/reproducing device 353 drives the not-illustrated semiconductor laser device located in the optical pickup 352, in order to determine an optimum laser power by the recording and reproduction processes for the OPC pattern, together with a not-illustrated timing generator or the like, under the CPU 354, upon the OPC process.

The memory 355 is used in the whole data processing and the OPC process or the like on the disc drive 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like.

The CPU (drive control device) 354 is connected to the signal recording/reproducing device 353 and the memory 355 through the bus 357, and controls the entire disc drive 300 by giving an instruction to various controlling devices. Normally, software or firmware for operating the CPU 354 is stored in the memory 355.

The data input/output control device 306 controls the input/output of the data from the exterior with respect to the disc drive 300, to thereby perform storage to and export from the data buffer on the memory 355. A drive control command issued from the external host computer 400 connected to the disc drive 300 through an interface, such as a SCSI and an ATAPI, is transmitted to the CPU 354 through the data input/output control device 306. Moreover, the record/reproduction data is also transmitted to and received from the host computer 400 through the data input/output control device 306, in the same manner.

The operation/display control device 307 receives an operation instruction and performs display with respect to the host computer 400, and transmits an instruction by the operation button 310, such as an instruction to record or reproduce, to the CPU 359. The CPU 359 may transmit a control command to the disc drive 300, through the data input/output control device 308, on the basis of instruction information from the operation/display control device 307, to thereby control the entire disc drive 300. In the same manner, the CPU 359 can transmit a command for requesting the disc drive 300 to transmit an operational state to the host, with respect to the disc drive 300. By this, the operational state of the disc drive 300, such as during recording and during reproduction, can be recognized, so that the CPU 359 can output the operational state of the disc drive 300 to the display panel 310, such as a fluorescent tube and an LCD, through the operation/display control device 307.

The memory 360 is an inner storage apparatus used by the host computer 400, and is provided with: a ROM area into which a firmware program, such as a BIOS (Basic Input/Output System), is stored; a RAM area into which a parameter required for the operation of an operating system and an application program or the like is stored; and the like. Moreover, the memory 360 may be connected to a not-illustrated external storage apparatus, such as a hard disk, through the data input/output control device 308.

One specific example used by combining the disc drive 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 360, on the CPU 359. Moreover, in another specific example, the disc drive 300 is a disc drive (hereinafter referred to as a "drive", as occasion demands), and the host computer 400 is a personal computer and a work station. The host computer, such as the personal computer, and the drive are connected through the data input/output control devices 306 and 308, such as the SCSI and the ATAPI, and application, such as writing software, installed in the host computer 400 controls the disc drive 300.

(2) Operation Principle

Next, with reference to FIG. 3 to FIG. 13, the recording operation of the recording/reproducing apparatus 200 in the embodiment will be discussed. Here, the overall outline of the operation principle will be explained by using FIG. 3 and FIG. 4, and supplementary or more detailed explanation will be given by using FIG. 4 to FIG. 13. Each of FIG. 3 and FIG. 4 is a flowchart conceptually showing a flow of a formation operation of the middle areas 109 and 119 (a partial operation of a finalize process), out of the recording operation of the recording/reproducing apparatus 200 in the embodiment.

The recording/reproducing apparatus 200 records movie data, audio data, data for PC, or the like into the data areas 105 and 115. At this time, as a general rule, it records the data into the data area 115 of the L1 layer after recording the data into the data area 105 of the L0 layer. In other words, the recording/reproducing apparatus 200 records the data into the data area 115 of the L1 layer, by irradiating the L1 layer with the laser light LB through the data area 105 of the L0 layer in which the data is recorded. The same is true for other recording areas, as a general rule. After the recording of the data is ended in the data areas 105 and 115, the recording/reproducing apparatus 200 records necessary data or dummy data (e.g. "00h" data, etc.) into the lead-in area 102, the lead-out area 118, and the middle areas 109 and 119, as occasion demands, if needed. In other words, it performs the finalize process. Hereinafter, out of the finalize process, a recording operation of the dummy data or the like into the middle areas 109 and 119 will be particularly discussed.

As shown in FIG. 3, under the control of the CPU 354 or 359, which constitutes one specific example of the "controlling device" of the present invention, at first, the position tolerance of each of the L0 layer and the L1 layer is obtained (step S101). Instead of obtaining the position tolerance, the acceptable value of the position tolerance in the standard may be obtained as the position tolerance. The position tolerance is a position shift between a position where a predetermined address in design is to be originally disposed and a position where the predetermined address is actually disposed on the optical disc 100 or an acceptable range of the position shift. Now, the position tolerance will be explained in more detail, with reference to FIG. 5. FIG. 5 are schematic conceptual views conceptually showing the position tolerance.

As shown in FIG. 5(a), it is assumed that an address "X" is disposed at a radial position "r" in design. By this, the arrangement of the lead-in area 101, the data areas 105 and 115, the lead-out area 118, and the middle areas 109 and 119 is defined, in design. At this time, there is likely a case where the address "X" is not accurately disposed at the radial position "r" where the address "X" is to be originally disposed, due to manufacturing errors of a stampa or the like, which is to form a land pre-pit or wobble which defines the address; in other words, due to manufacturing errors of an original disc for producing the stampa, errors in the radial position of a cutting machine for producing the original disc, uneven track pitches, or the like. Alternatively, there is likely a case where the address "X" is not accurately disposed at the radial position "r" where the address "X" is to be originally disposed, due to an individual difference in heat contraction or the like in the production of the optical disc 100.

Specifically, as shown in FIG. 5(b), it is likely that an address "X+$\Delta$X" is disposed at the radial position "r" where the address "X" is to be originally disposed. At this time, the address "X" is disposed at a radial position "r−$\Delta$r1" obtained by shifting from the radial position "r" to the inner circumferential side by "$\Delta$r1". A value of "$\Delta$r1" or the acceptable range of "$\Delta$r1" is referred to the position tolerance. The position tolerance is likely caused in each recording layer, so that in the step S101 in FIG. 3, the position tolerance is obtained in both the L0 layer and the L1 layer. Incidentally, if the state of FIG. 5(b) indicates the state that the position tolerance is caused, FIG. 5(a) is a view which indicates the state that position tolerance is "0".

In FIG. 3 again, a layer tolerance "Tls", which constitutes one specific example of the "tolerance length" of the present invention, is calculated, by adding the position tolerance in the L0 layer to the position tolerance in the L1 layer, obtained in the step S101, under the control of the CPU 354 or 359 (step S102). Namely, the layer tolerance indicates the acceptable range of a relative position shift (or the relative position shift itself between (i) the address which is defined on a predetermined radial position in the L0 layer and (ii) the address which is related to the predetermined radial position in the L1 layer (i.e. the address which is defined on the predetermined radial position in the L1 layer).

Then, a clearance "Cls" is calculated (step S103). Specifically, a clearance related to an eccentricity corresponding to a shift of the center positions or the like of the L0 layer and the L1 layer (hereinafter referred to as an "eccentric clearance", as occasion demands) and a clearance related to the size of a beam spot of the defocused laser light (hereinafter referred to as a "spot clearance", as occasion demands) are added, to thereby calculate the clearance "Cls". Now, the clearance "Cls" will be discussed with reference to FIG. 6 and FIG. 7. FIG. 6 are schematic conceptual views conceptually showing the eccentric clearance out of the clearance "Cls". FIG. 6 are schematic conceptual views conceptually showing the spot clearance out of the clearance "Cls".

As shown in FIG. 6(a), in the case of the optical disc 100 without an eccentricity, the address "X" defined at the radial position "r" in the L0 layer and an address "X(bar)" defined at the radial position "r" in the L1 layer are in such a relationship that they face (or are opposed) to each other on the track of the radius "r". Incidentally, the eccentricity is a relative shift of the L0 layer and the L1 layer, caused by a shift of the center positions of the both layers, a position shift of the center positions in pasting the L0 layer and the L1 layer, or the like. Incidentally, for confirmation, it is explanatorily noted that "X" with a line on the upper side in FIG. 6(a) is referred to as "X(bar)". The same is true for all the drawings below.

On the other hand, as shown in FIG. 6(b), in the case of the optical disc 100 with an eccentricity, the address "X" defined at the radial position "r" in the L0 layer and the address "X(bar)" defined at the radial position "r" in the L1 layer face only at two points on the track of the radius "r". In other words, the address "X" of the L0 layer and the address "X(bar)" of the L1 layer, which are to be originally defined at the facing positions, do not face in most places. Specifically, the sum of the eccentricity in the L0 layer and the L1 layer corresponds to the eccentric clearance. In the case of FIG. 6(b), the address "X" of the L0 layer is located away from the address "X(bar)" of the L1 layer, on the outer circumferential side, by "$\Delta r2$" corresponding to the amount of the eccentricity. The maximum value of "$\Delta r2$" corresponds to the eccentric clearance.

Moreover, as shown in FIG. 7(a), if the laser light LB is focused on the L1 layer, a beam spot with a predetermined radius of "$\Delta r3$" is formed on the L0 layer. Now, as described above, a case where the data is recorded into the L1 layer by irradiating the L1 layer with the laser light LB through the L0 layer in which the data is recorded, is considered. As shown in FIG. 7(a), in the case where the data is recorded until the address "X" of the L0 layer, if the laser light LB is focused on the address "X(bar)" of the L1 layer which faces the address "X", the L1 layer is irradiated with the left half of the laser light LB through the L0 layer in which the data is recorded, while the L1 layer is irradiated with the right half of the laser light LB through the L0 layer in which the data is unrecorded. Therefore, only by recording the data into the L1 layer which faces the L0 layer in which the data is recorded without considering the above case, it is impossible to preferably record the data into the L1 layer by irradiating the L1 layer with the laser light LB through the L0 layer in which the data is recorded.

Thus, as shown in FIG. 7(b), it is necessary to shift the focus position of the laser light LB in the case where the data is recorded into the L1 layer, to the inner circumferential side, by a distance corresponding to the radius "$\Delta r3$" of the beam spot, from the position represented by the address "X(bar)" of the L1 layer which faces the address "X" of the L0 layer in which the data is recorded. Specifically, it is necessary to focus the laser light LB on a position represented by an address "X(bar)−$\Delta X$" obtained by shifting to the inner circumferential side by a variable "$\Delta X$" of the address corresponding to the radius "$\Delta r3$" of the beam spot. The maximum value of the radius "$\Delta r3$" of the beam spot corresponds to the spot clearance.

In the step S103 in FIG. 3, the clearance "Cls" is calculated by adding the eccentric clearance, explained in FIG. 6, to the spot clearance, explained in FIG. 7.

In FIG. 3 again, under the control of the CPU 354 or 359, an address offset "Ofs" is calculated which is the sum of the layer tolerance "Tls" calculated in the step S102 and the clearance "Cls" calculated in the step S103 is calculated, on the basis of a corresponding equation (step S104). More specifically, the size of the data which is recorded into the recording area having a distance in the radial direction corresponding to the sum of the layer tolerance "Tls" and the clearance "Cls" is calculated as the address offset "Ofs", on the basis of the corresponding equation. The corresponding equation used in the step S104 indicates a correspondence relationship between the size of the recording area (e.g. distance in the radial direction) and the size of the data recorded in the recording area (e.g. the number of ECC blocks). The corresponding equation will be discussed in detail with reference to FIG. 8. FIG. 8 is a graph conceptually showing a specific example of the corresponding equation used in the step S104 in FIG. 3.

As shown in FIG. 8, the corresponding equation is shown by a graph (or function), wherein the sum of the layer tolerance "Tls" and the clearance "Cls" is assigned to the horizontal axis and the number of ECC blocks is assigned to the vertical axis. More specifically, this graph is indicated by the function: Tls+Cls=5.4686×the number of ECC blocks−0.219. From the graph, it is possible to obtain the size of the data which can be recorded into the recording area with the distance in the radial direction of "Tls+Cls". For example, if "Tls+Cls=105 μm", the data with a size of 574ECC blocks (23Eh ECC blocks) can be recorded.

In FIG. 3 again, then, under the control of the CPU 354 or 359, a data size "N" of the data is calculated, which is included (i.e. recorded) in the recording area whose distance in the radial direction is "Tls", on the relatively outer circumferential side of the optical disc 100, on the basis of the corresponding equation (step S105). The corresponding equation used in the step S105 indicates a correspondence relationship between the size of the recording area (e.g. distance in the radial direction) and the size of the data recorded in the recording area (e.g. the number of ECC blocks), as with the corresponding equation used in the step S104. The corresponding equation will be discussed in detail with reference to FIG. 9. FIG. 9 is a graph conceptually showing a specific example of the corresponding equation used in the step S105 in FIG. 3.

As shown in FIG. 9, the corresponding equation is shown by a graph (or function), wherein the distance "Tls" in the radial direction is assigned to the horizontal axis and the number of ECC blocks is assigned to the vertical axis. At this time, a plurality of graphs depending on the type of the optical disc 100 may be defined as the corresponding equation. For example, as shown in FIG. 9, in accordance with the size of the optical disc 100, the corresponding equation of an optical disc with a diameter of 12 cm and the corresponding equation of an optical disc with a diameter of 8 cm may be defined. More specifically, this graph is indicated by the function: Tls=5.4718×the number of ECC blocks in the case where the radius of the optical disc is 12 cm, the function: Tls=3.6×the number of the ECC blocks in the case where the radius of the optical disc is 8 cm. From the graph, it is possible to obtain the size of the data which can be recorded into the recording area with the distance in the radial direction of "Tls". For example, if "Tls=40 μm", the data with a size of 219ECC blocks (DBh ECC blocks) can be recorded in the optical disc with a diameter of 12 cm, and the data with a size of 144ECC blocks (90h ECC blocks) can be recorded in the optical disc with a diameter of 8 cm.

Incidentally, the corresponding equations may be stored in advance in the memory 355 or 360 in the recording/reproducing apparatus 200, which constitutes one specific example of the "storing device" of the present invention, or may be recorded on the optical disc 100. Moreover, it is obvious that the corresponding equation is not limited to the aspect shown in FIG. 8 and FIG. 9. For example, it may be a predetermined table. In short, information for defining a relationship between the distance in the radial direction and the size of the data which can be recorded in the distance can be used as the above-mentioned corresponding equation.

Incidentally, the size of the data which is obtained by using the corresponding equations of FIG. 8 and FIG. 9, is used in calculating the address of the edge on each of the inner and outer circumferential sides of the middle areas 109 and 119. This is because even if "Tls+Cls" or "Tls" is merely obtained as the distance in the radial direction, the recording/reproducing apparatus 200 cannot easily recognize it as the address "B". That is because the recording/reproducing apparatus 200 has difficulty in recognizing the position of the recording area in the L0 layer and the L1 layer by the "distance in the radial direction" and recognizes it by the address position. At this time, the data in a predetermined size is recorded in a predetermined address range, so that it is enough to make the recording/reproducing apparatus 200 recognize the distance in the radial direction, as the size of the data. If the recording/reproducing apparatus 200 recognizes the distance in the radial direction, as the size of the data which can be recorded in the recording area, it is converted to the address, by which it is possible to calculate the address of the edge on each of the inner and outer circumferential sides of the middle areas 109 and 119.

In FIG. 3 again, then, under the control of the CPU 354 or 359, a data size "M" of the data is calculated, which can be recorded into the recording area between the most outer circumferential point (i.e. the edge on the outer circumferential side) of the data areas 105 and 115 and a 0.4 mm outer circumferential point therefrom (step S106). In this case, from the viewpoint of operation stability, the value of 0.4 mm can be set as a fixed value. Thus, the size "M" may be also stored in advance in the memory 355 or 360, or the like.

In FIG. 3 again, after that, RMD (Recording Management Data) recorded in the RMA 103 or 113 is obtained (step S107). The RMD includes information which indicates the recording state of the data on the optical disc 100 (i.e. which recording area has the data recorded, or which recording area does not have the data recorded).

Then, under the control of the CPU 354 or 359, a most inner circumferential address (i.e. the start address of the middle area 109) "A" of the middle area 109 in the L0 layer is obtained (step S108). This is obtained by referring to the land pre-pit and the RMD obtained in the step S107. Then, under the control of the CPU 354 or 359, the address which is located on the position obtained by shifting toward the outer circumferential side by "M" from the position represented by the address "A" is calculated as an address "B" (step S109).

Then, under the control of the CPU 354 or 359, a most inner circumferential address (i.e. the end address of the middle area 119) "E" of the middle area 119 in the L1 layer is obtained (step S110). This is also obtained by referring to the land pre-pit and the RDM obtained in the step S107. Then, under the control of the CPU 354 or 359, the address which is located on the position obtained by shifting toward the outer circumferential side by "M+Ofs+N" from the position represented by the address "E" is calculated as an address "D" (step S111).

Then, as shown in FIG. 4, under the control of the CPU 354 or 359, it is judged whether or not the dummy data or the like is already pre-recorded in the middle area 109 of the L0 layer (step S112). This judgment is performed on the basis of the RMD obtained in the step S107.

As a result of the judgment, if it is judged that the dummy data or the like is pre-recorded in the middle area 109 of the L0 layer (the step S112: Yes), an address next to the most outer circumferential address of the pre-recorded dummy data or the like (i.e. the most outer circumferential address of the recording area in which the dummy data or the like is already pre-recorded, out of the middle area 109, and the address where the pre-recorded is ended) is obtained as a new address "A", on the basis of the RMD obtained in the step S107, under the control of the CPU 354 or 359 (step S113). Then, the operational flow goes to a step S114. On the other hand, if it is judged that the dummy data or the like is not pre-recorded in the middle area 109 of the L0 layer (the step S112: No), the operational flow goes to the step S114 without the step S113.

Then, it is judged whether or not the dummy data or the like is pre-recorded in the middle area 119 of the L1 layer (step S114). This judgment is performed on the basis of the RMD obtained in the step S107.

As a result of the judgment, if it is judged that the dummy data or the like is pre-recorded in the middle area 119 of the L1 layer (the step S114: Yes), an address immediately before the most outer circumferential address of the pre-recorded dummy data or the like (i.e. the most outer circumferential address of the recording area in which the dummy data or the like is pre-recorded, out of the middle area 119, and the address where the pre-recorded is started) is obtained as a new address "E", on the basis of the RMD obtained in the step S107, under the control of the CPU 354 or 359 (step S115). Then, the operational flow goes to a step S116. On the other hand, if it is judged that the dummy data or the like is not pre-recorded in the middle area 119 of the L1 layer (the step S114: No), the operational flow goes to a step S116 without the step S115.

Then, by that the CPU 354 or 359, which constitutes one specific example of the "forming device" of the present invention, controls the optical pickup 352 and the signal recording/reproducing device 353, the predetermined dummy data or the like is pre-recorded into the recording area between the address "A" and the address "B" in the L0 layer, to thereby form the middle area 109 (the step S116). Moreover, the predetermined dummy data or the like is prerecorded into the recording area between the address "D" and the address "E" in the L1 layer, to thereby form the middle area 119 (the step S117).

The aspect on the optical disc 100 at this time will be explained with reference to FIG. 10 and FIG. 11. FIG. 10 is a schematic conceptual view schematically showing a relationship between each area and the address on the optical disc 100 if the dummy data or the like is not pre-recorded into the middle area 109. FIG. 11 is a schematic conceptual view schematically showing the relationship between each area and the address on the optical disc 100 if the dummy data or the like is already pre-recorded in the middle area 109.

As shown in FIG. 10, if the dummy data is not pre-recorded in advance in the middle area 109 (or 119), the most inner circumferential address of the middle area 109 in the L0 layer corresponds to the address "A", and the address of the position obtained by shifting to the outer circumferential side by "M" (i.e. the distance in the radial direction of 0.4 mm) from the address "A" corresponds to the address "B". Moreover, the most inner circumferential address of the middle area 119 in the L1 layer corresponds to the address "E", and the address of the position obtained by shifting to the outer circumferential side by "M+Ofs+N" (i.e. the distance in the radial direction of "0.4 mm+Cls+Tls×2") from the address "E" corresponds to the address "D". At this time, a recording area between an area portion of the L1 layer corresponding to the edge on the inner circumferential side of the middle area 109 in the L0 layer and the edge on the inner circumferential side of the middle area 119 in the L1 layer corresponds to the recording area having a size of the address offset "Ofs" in the radial direction. Moreover, a recording area between an area portion of the L1 layer corresponding to the edge on the outer circumferential side of the middle area 109 in the L0 layer and the edge on the outer circumferential side of the middle area 119 in the L1 layer corresponds to the recording area having a size of the layer tolerance "Tls" in the radial direction.

Moreover, as shown in FIG. 11, if the dummy data or the like is already pre-recorded in the middle area 109 (or 119), the address next to the most outer circumferential address of the dummy data or the like which is pre-recorded in the L0 layer corresponds to the address "A", and the address of the position obtained by shifting to the outer circumferential side by "M" from the most inner circumferential address of the middle area 109 in the L0 layer corresponds to the address "B". Moreover, the address immediately before the most outer circumferential address of the dummy data or the like which is pre-recorded in the L1 layer corresponds to the address "E", and the address of the position obtained by shifting to the outer circumferential side by "M+Ofs+N" from the most inner circumferential address of the middle area 119 in the L1 layer corresponds to the address "D".

Then, under the control of the CPU 354 or 359, the dummy data is pre-recorded into the recording area from the address "A" to the address "B", to thereby form the final middle area 109. Moreover, under the control of the CPU 354 or 359, the dummy data is pre-recorded into the recording area from the address "D" to the address "E", to thereby form the final middle area 119.

If the specific value of the address is applied, it is like FIG. 12 and FIG. 13. FIG. 12 is a schematic conceptual view showing the specific value of the address of a DVD-R with a diameter of 12 cm, which is one specific example of the optical disc 100. FIG. 13 is a schematic conceptual view showing the specific value of the address of a DVD-R with a diameter of 8 cm, which is another specific example of the optical disc 100.

Incidentally, in FIG. 12 and FIG. 13, in accordance with "20 µm" as being the acceptable range of the position tolerance in the standard in each recording layer, "40 µm" is used as a specific numerical value of the layer tolerance. Moreover, "65 µm" is used as a specific numerical value of the clearance. Moreover, FIG. 12 and FIG. 13 show the case where a decrement address method is adopted in which the address decreases toward the outer circumferential side in the L0 layer and the address decreases toward the inner circumferential side in the L1 layer. Of course, in the case of an increment address method in which the address increases toward the outer circumferential side in the L0 layer and the address increases toward the inner circumferential side in the L1 layer, the specific value is different.

As shown in FIG. 12, in the case of the DVD-R with a diameter of 12 cm, the address "A" (i.e. the most inner circumferential address of the middle area 109 in the L0 layer) is "FDD109h". Then, it can be seen that the size "M" of the data which can be recorded in the recording area with a distance L (=0.4 mm) in the radial direction is 2179 ECC blocks (=883hECC blocks) in the step S106 in FIG. 3. Therefore, the address "B" is "FDD109h"–"883h"+1="FDC887h". Moreover, the address "E" (i.e. the most inner circumferential address of the middle area 119 in the L1 layer) is the bit inverse address of the address "A" and is "022EF6h". Then, the size "N" of the data which can be recorded in the recording area with the distance L (=Tls) in the radial direction is 219 ECC blocks (=DBh ECC blocks) in the step S105 in FIG. 3. Moreover, the address offset "Ofs" is calculated as 574 ECC blocks (=23Eh ECC blocks). Therefore, the address "D" is "022EF6h"+"883h"+"DBh"+"23Eh"–1="023A91h".

Moreover, as shown in FIG. 11, in the case of the DVD-R with a diameter of 8 cm, the address "A" is "FF3030h". Then, it can be seen that the size "M" of the data which can be recorded in the recording area with the distance L (=0.4 mm) in the radial direction is 1432 ECC blocks (=598h ECC blocks) in the step S106 in FIG. 3. Therefore, the address "B" is "FF3030h"–"598h"+1="FF2A99h". Moreover, the address "E" is the bit inverse address of the address "A" and is "00CFCFh". Then, the size "N" of the data which can be recorded in the recording area with the distance L (=Tls) in the radial direction is 144 ECC blocks (=90hECC blocks) in the step S105 in FIG. 3. Moreover, the address offset "Ofs" is calculated as 574 ECC blocks (=23Eh ECC blocks). Therefore, the address "D" is "00CFCFh"+"598h"+"90h"+"23Eh"–1="00D834h".

Incidentally, the address "A" is not necessarily constant because a disc maker can determine it; however, the addresses "B", "D", and "E" are easily obtained by substituting it for the above-mentioned equation in the calculation.

As explained above, by forming the middle areas 109 and 119, it is possible to receive various benefits discussed below. The benefits will be discussed with reference to FIG. 14. FIG. 14 are schematic conceptual views schematically showing the relationship between each area and the address on the optical disc without the position shift (or position tolerance) and with the maximum position shift (or position tolerance).

As shown in FIG. 14(a), if there is no position shift (i.e. the position shift is 0 in each recording layer), the edge on the inner circumferential side of the middle area 109 in the L0 layer and the edge on the outer circumferential side of the middle area 119 in the L1 layer are away from each other by 0.4 mm+Tls.

On the other hand, as shown in FIG. 14(b), if the position shift is maximum (i.e. in the worst case where the position in the L0 layer is shifted by 20 µm on the outer circumferential side and the position in the L1 layer is shifted by 20 µm on the inner circumferential side), the edge on the inner circumferential side of the middle area 109 in the L0 layer and the edge on the outer circumferential side of the middle area 119 in the L1 layer are away from each other by 0.4 mm. Namely, the position shift caused by the position tolerance is absorbed by a margin corresponding to "Tls" which is provided between the edge on the inner circumferential side of the middle area 109 in the L0 layer and the edge on the outer circumferential side of the middle area 119 in the L1 layer. As a result, even if the position shift is maximum, it is possible to ensure a distance of 0.4 mm between the edge on the inner circumferential side of the middle area 109 in the L0 layer and the edge on the outer circumferential side of the middle area 119 in the L1 layer.

As explained above, according to the recording/reproducing apparatus 200 in the embodiment, it is possible to form the middle areas 109 and 119, in view of the layer tolerance and the like. Thus, even if there arises the position shift of the address or the like, it is possible to ensure the distance of 0.4 mm between the edge on the inner circumferential side of the middle area 109 in the L0 layer and the edge on the outer circumferential side of the middle area 119 in the L1 layer. Therefore, it is possible to preferably ensure the stability of the operation of the recording/reproducing apparatus 200 (particularly, the stability of the operation in reproducing the information on the optical disc 100). In addition, there is no need to form the unnecessarily large middle areas 109 and 119, so that it is possible to form the middle areas 109 and 119 in the preferable size, without an increase in a time length required for the finalize process.

In addition, according to the recording/reproducing apparatus 200 in the embodiment, the address position (specifically, the address "B" and the address "D") is calculated by a data recording unit, on the basis of not the distance in the radial direction of the optical disc 100 but the corresponding equation shown in FIG. 8 and FIG. 9. Thus, it is possible to form the middle areas 109 and 119 in the preferable size, in a format easily recognized or easily handled by the recording/reproducing apparatus 200. Therefore, it is possible to reduce a processing load required for the recording operation of the recording/reproducing apparatus 200.

Moreover, by using the plurality of corresponding equations, it is possible to form the middle areas 109 and 119 in the preferable size for each type, depending on the type of the optical disc 100 (e.g. depending on the size of the diameter and a difference in the standard). Alternatively, it is possible to form the middle areas 109 and 119 in the preferable size, depending on where the middle areas 109 and 119 are disposed (e.g. depending on whether the middle areas 109 and 119 are located relatively on the inner circumferential side of the optical disc 100, or relatively on the middle circumferential side, or relatively on the outer circumferential side).

Incidentally, FIG. 10 and FIG. 11 show the case where the middle areas 109 and 119 are disposed, by using a position determined in advance in the standard as a starting point. However, it is obvious that the middle areas 109 and 119 may be constructed to be located on the further inner circumferential side (e.g. in the middle of the data areas 105 and 115) if the size of the data recorded in the data areas 105 and 115 is small. Even in that case, it is possible to form the middle areas 109 and 119 in the preferable size by performing the above-mentioned operation. Specifically, the address next to the most outer circumferential address of the recording area in which the data is recorded out of the data area 105 is the above-mentioned address "A". The address immediately before the most outer circumferential address of the recording area in which the data is recorded out of the data area 115 is the above-mentioned address "E". The same operation as that explained above is performed for the calculation of the address "B" and the address "D".

In addition, it is obvious that the optical disc itself on which the middle areas 109 and 110 in the preferable size are formed is also included in the scope of the present invention.

(Modified Operation Example)

Next, with reference to FIG. 15 and FIG. 16, the modified operation example of the recording/reproducing apparatus 200 in the embodiment will be discussed. FIG. 15 and FIG. 16 are schematic conceptual views schematically showing the relationship between each area and the address on the optical disc if the dummy data or the like is pre-recorded before the finalize process. Incidentally, the same constitutional elements and the same processes as those in the operation, explained with reference to FIG. 3 to FIG. 13, carry the same reference numerals and the same step numbers, and the explanation thereof are omitted, as occasion demands.

The modified operation example is an operation example in which the middle areas 109 and 119 area formed if the dummy data or the like is pre-recorded in recording areas corresponding to the middle areas 109 and 119 (specifically, the middle area 109 defined by default) before the finalize process.

As shown in FIG. 15, the dummy data or the like is pre-recorded in recording areas corresponding to the middle areas 109 and 119 before the finalize process. Specifically, the dummy data or the like is pre-recorded in both a recording area from an address "a" to an address "b" and a recording area from an address "d" to an address "e".

In performing the finalize process with respect to the optical disc 100, the dummy data or the like is recorded into a recording area other than the recording area from the address "a" to the address "b" out of the recording area from the address "A" to the address "B", explained in FIG. 3 to FIG. 13, by which the middle area 109 is formed. In the same manner, the dummy data or the like is recorded into a recording area other than the recording area from the address "d" to the address "e" out of the recording area from the address "D" to the address "E", explained in FIG. 3 to FIG. 13, by which the middle area 119 is formed. Namely, the dummy data or the like is not recorded again into the recording area in which the dummy data or the like is already recorded, in the finalize process. In other words, there is no need to unnecessarily record the dummy data.

As described above, it is possible to reduce a time length required for the finalize process by recording the dummy data except the recording area in which the dummy data or the like is pre-recorded. Moreover, even if the effective (i.e. meaningful) dummy data or the like is pre-recorded, it is possible to prevent a disadvantage of overwriting the effective dummy data or the like.

Moreover, the same is true even if the middle areas 109 and 119 are formed to be located in the middle of the data areas 105 and 115. Specifically, as shown in FIG. 16, it is assumed that the dummy data or the like is pre-recorded in recording areas corresponding to the middle areas 109 and 119 before the finalize process. Specifically, it is assumed that the dummy data or the like is pre-recorded in both a recording area from an address "a" to an address "b" and a recording area from an address "d" to an address "e". Even in this case, the dummy data or the like is recorded into a recording area other than the recording area from the address "a" to the address "b" out of the recording area from the address "A" to the address "B", explained in FIG. 3 to FIG. 13, by which the middle area 109 is formed. In the same manner, the dummy data or the like is recorded into a recording area other than the recording area from the address "d" to the address "e" out of the recording area from the address "D" to the address "E", explained in FIG. 3 to FIG. 13, by which the middle area 119 is formed. In FIG. 16, however, the recording area from the address "A" to the address "B" and the recording area from the address "a" to the address "b" are not overlapped. As a result, the dummy data is recorded into the whole recording area from the address "A" to the address "B", by which the middle area 109 is formed. Moreover, the recording area from the address "D" to the address "E" and the recording area from the address "d" to the address "e" are partially overlapped. As a result, the dummy data is recorded into a recording area from the address "e" to the address "E", by which the middle area 119 is formed.

Moreover, in the above-mentioned embodiments, the optical disc 100 is explained as one example of the recording medium, and the recorder or player related to the optical disc 100 is explained as one example of the recording/reproducing apparatus. The present invention, however, is not limited to the optical disc and the recorder thereof, and can be applied to other various recording media, and the recorders or players thereof, which support high density recording or high transfer rate.

The present invention is not limited to the above-described embodiments, and various changes may be made, if desired, without departing from the essence or spirit of the invention which can be read from the claims and the entire specification. A recording medium, a recording apparatus, a recording method, and a computer program for recording control, which involve such changes, are also intended to be within the technical scope of the present invention.

INDUSTRIAL APPLICABILITY

The recording apparatus, the recording method, and the computer program according to the present invention can be applied to a high-density recording medium, such as a DVD, for example, and also applied to an information recording apparatus, such as a DVD recorder. Moreover, they can be applied to an information recording apparatus or the like, which is mounted on or can be connected to various computer equipment for consumer use or business use, for example.

The invention claimed is:

1. A recording medium comprising:
a first recording layer which is irradiated with laser light to thereby record therein record information; and
a second recording layer which is irradiated with the laser light through said first recording layer to thereby record therein the record information, wherein
each of said first recording layer and said second recording layer comprises a buffer area to buffer a changing operation of the recording layer in which the record information is recorded,
a length, in a radial direction of said recording medium, of the buffer area in said first recording layer is set to be equal to or greater than a predetermined value,
the buffer area in said second recording layer overlaps, along a normal line of said recording medium, with the buffer area in said first recording layer,
a length, in a radial direction of said recording medium, of the buffer area in said second recording layer is longer than a length, in a radial direction of said recording medium, of the buffer area in said first recording layer,
an edge on an outer circumferential side of the buffer area in said second recording layer is disposed at a position obtained by shifting by a tolerance length, which indicates an acceptable range of a relative position shift between an address which is defined on the predetermined position in the first recording layer and an address which is related to the predetermined position in the second recording layer, from an area portion of said second recording layer corresponding to an edge on an outer circumferential side of the buffer area in said first recording layer, and
an edge on an inner circumferential side of the buffer area in said second recording layer is disposed at a position obtained by shifting by the tolerance length from an area portion of said second recording layer corresponding to an edge on an inner circumferential side of the buffer area in said first recording layer.

2. The recording medium according to claim 1, wherein a length in a radial direction of said recording medium of the buffer area in said second recording layer corresponds to a sum of (i) the predetermined value, (ii) a double size of the tolerance length, and (iii) a clearance length which indicates each of a spot radius of the laser light on said first recording layer if the laser light is focused on said second recording layer and a relative eccentric shift of said first and second recording layers.

3. The recording medium according to claim 2, wherein the clearance length is set to substantially 65 μm in a radial direction of said recording medium.

4. The recording medium according to claim 1, wherein the predetermined value is set to be substantially 0.4 mm in a radial direction of said recording medium.

5. The recording medium according to claim 1, wherein the tolerance length is set to substantially 40 μm in a radial direction of said recording medium.

6. The recording medium according to claim 1, wherein the record information is recorded into said first recording layer in one direction, and the record information is recorded into said second recording layer in another direction different from the one direction.

7. A recording apparatus comprising:
a recording device for recording record information by irradiating laser light onto a recording medium comprising: (i) a first recording layer which is irradiated with the laser light to thereby record therein the record information; and (ii) a second recording layer which is irradiated with the laser light through the first recording layer to thereby record therein the record information;
a forming device for forming a buffer area to buffer a changing operation of the recording layer in which the record information is recorded, in each of said first recording layer and said second recording layer; and
a controlling device for controlling said forming device to form the buffer area in which (i) a length, in a radial direction of said recording medium, of the buffer area in said first recording layer is set to be equal to or greater than a predetermined value, (ii) in which the buffer area in said second recording layer overlaps, along a normal line of said recording medium, with the buffer area in said first recording layer, (iii) in which a length, in a radial direction of said recording medium, of the buffer area in said second recording layer is longer than a length, in a radial direction of said recording medium, of the buffer area in said first recording layer, (iv) in which an edge on an outer circumferential side of the buffer area in said second recording layer is disposed at a position obtained by shifting by a tolerance length, which indicates an acceptable range of a relative position shift between an address which is defined on the predetermined position in the first recording layer and an address which is related to the predetermined position in the second recording layer, from an area portion of said second recording layer corresponding to an edge on an outer circumferential side of the buffer area in said first recording layer, and (v) in which an edge on an inner circumferential side of the buffer area in said second recording layer is disposed at a position obtained by shifting by the tolerance length from an area portion of said second recording layer corresponding to an edge on an inner circumferential side of the buffer area in said first recording layer.

8. The recording apparatus according to claim 7, wherein said controlling device controls said forming device such that a length in a radial direction of said recording medium of the buffer area in said second recording layer corresponds to a sum of (i) the predetermined value, (ii) a double size of the tolerance length, and (iii) a clearance length which indicates each of a spot radius of the laser light on said first recording layer if the laser light is focused on said second recording layer and a relative eccentric shift of said first and second recording layers.

9. The recording apparatus according to claim 8, wherein the clearance length is set to substantially 65 μm in a radial direction of said recording medium.

10. The recording apparatus according to claim 7, wherein said recording apparatus further comprises a converting device for converting the tolerance length to a recording unit of the record information, and
said controlling device controls said forming device to form the buffer area, disposed at a position obtained by shifting by an extent corresponding to the tolerance length which is converted to the recording unit.

11. The recording apparatus according to claim 10, wherein said converting device converts the tolerance length to the recording unit of the record information, on the basis of correspondence information which defines a correspondence relationship between the tolerance length and a size of the record information which can be recorded into an area portion having a size corresponding to a predetermined tolerance length.

12. The recording apparatus according to claim 11, wherein said converting device converts the tolerance length to the recording unit of the record information, on the basis of at least one of a plurality of correspondence information, in accordance with at least one of a type of the recording medium and a position of the buffer area on the second recording layer.

13. The recording apparatus according to claim 11, further comprising a storing device for storing the correspondence information.

14. The recording apparatus according to claim 11, wherein said converting device converts the tolerance length to the recording unit of the record information, on the basis of the correspondence information recorded on the recording medium.

15. The recording apparatus according to claim 7, wherein the predetermined value is set to substantially 0.4 mm in a radial direction of said recording medium.

16. The recording apparatus according to claim 7, wherein the tolerance length is set to substantially 40 μm in a radial direction of said recording medium.

17. The recording apparatus according to claim 7, wherein the buffer area is formed by recording therein the record information, and
said controlling device controls said forming device to form the buffer area by recording therein the record information, except an area portion in which the record information is recorded in advance.

18. The recording apparatus according to claim 7, wherein the record information is recorded into said first recording layer in one direction, and the record information is recorded into said second recording layer in another direction different from the one direction.

19. A recording method in a recording apparatus comprising: a recording device for recording record information by irradiating laser light onto a recording medium comprising: (i) a first recording layer which is irradiated with the laser light to thereby record therein the record information; and (ii) a second recording layer which is irradiated with the laser light through the first recording layer to thereby record therein the record information; and a forming device for forming a buffer area to buffer a changing operation of the recording layer in which the record information is recorded, in each of said first recording layer and said second recording layer, said recording method comprising:
a first controlling process of controlling said recording device to record the record information; and
a second controlling process of controlling said forming device to form the buffer area in which (i) a length, in a radial direction of said recording medium, of the buffer area in said first recording layer is set to be equal to or greater than a predetermined value, (ii) in which the buffer area in said second recording layer overlaps, along a normal line of said recording medium, with the buffer area in said first recording layer, (iii) in which a length, in a radial direction of said recording medium, of the buffer area in said second recording layer is longer than a length, in a radial direction of said recording medium, of the buffer area in said first recording layer, (iv) in which an edge on an outer circumferential side of the buffer area in said second recording layer is disposed at a position obtained by shifting by a tolerance length, which indicates an acceptable range of a relative position shift between an address which is defined on the predetermined position in the first recording layer and an address which is related to the predetermined position in the second recording layer, from an area portion of said second recording layer corresponding to an edge on an outer circumferential side of the buffer area in said first recording layer, and (v) in which an edge on an inner circumferential side of the buffer area in said second recording layer is disposed at a position obtained by shifting by the tolerance length from an area portion of said second recording layer corresponding to an edge on an inner circumferential side of the buffer area in said first recording layer.

* * * * *